United States Patent [19]

Moriyama

[11] Patent Number: 5,982,557
[45] Date of Patent: Nov. 9, 1999

[54] OCULAR OPTICAL SYSTEM FOR A VIEWFINDER WITH VARIABLE VISIBILITY

[75] Inventor: Keiji Moriyama, Yokohama, Japan

[73] Assignee: Nikon Corporation, Tokyo, Japan

[21] Appl. No.: 09/162,968

[22] Filed: Sep. 29, 1998

[30] Foreign Application Priority Data

Sep. 30, 1997 [JP] Japan ................................ 9-283007

[51] Int. Cl.[6] .................................................... G02B 25/00

[52] U.S. Cl. ........................ 359/646; 359/643; 359/645; 396/382

[58] Field of Search ................................. 359/643, 644, 359/645, 646; 396/373, 382

[56] References Cited

U.S. PATENT DOCUMENTS

| | | | |
|---|---|---|---|
| 4,437,750 | 3/1984 | Ikari | 354/155 |
| 4,593,984 | 6/1986 | Kimura et al. | 354/219 |
| 5,066,115 | 11/1991 | Sugawara | 359/676 |

*Primary Examiner*—Georgia Epps
*Assistant Examiner*—David N. Spector
*Attorney, Agent, or Firm*—Michael N. Meller; Eugene Lieberstein

[57] ABSTRACT

An ocular optical system for a viewfinder in a camera for observing object image which is formed on focusing glass or its vicinity via eye point. The ocular optical system includes, in order from the focusing glass side, a negative meniscus lens, which has its convex surface facing the focusing glass side, and a positive lens. Visibility compensation is performed by moving the positive lens along the optical axis without moving the negative meniscus lens.

10 Claims, 22 Drawing Sheets

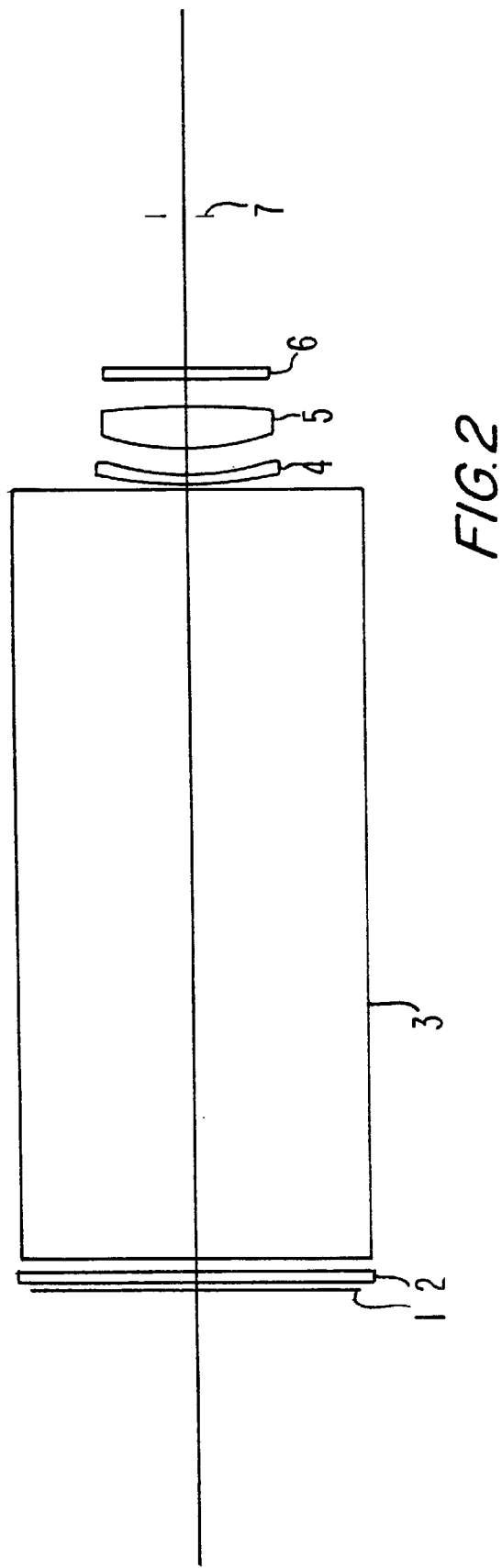

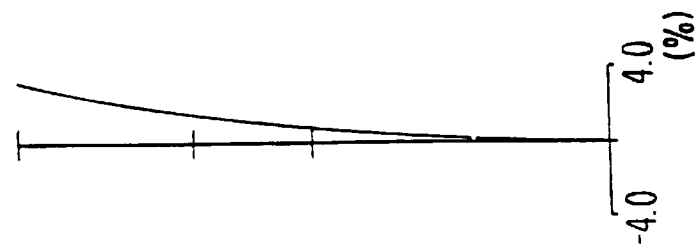
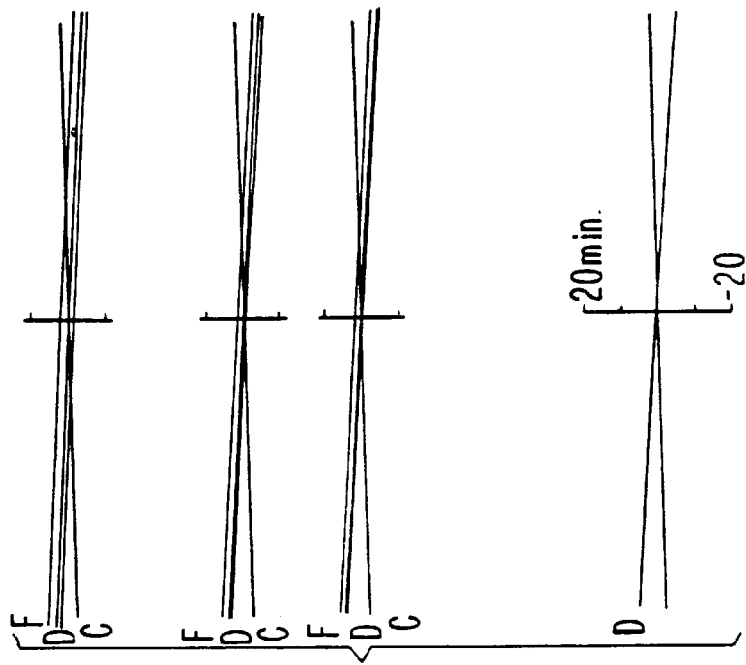
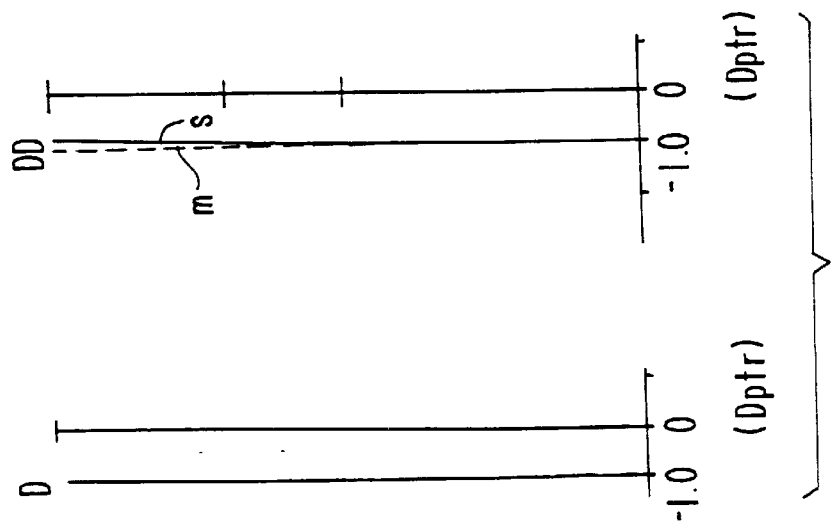
FIG.5c
FIG.5b
FIG.5a

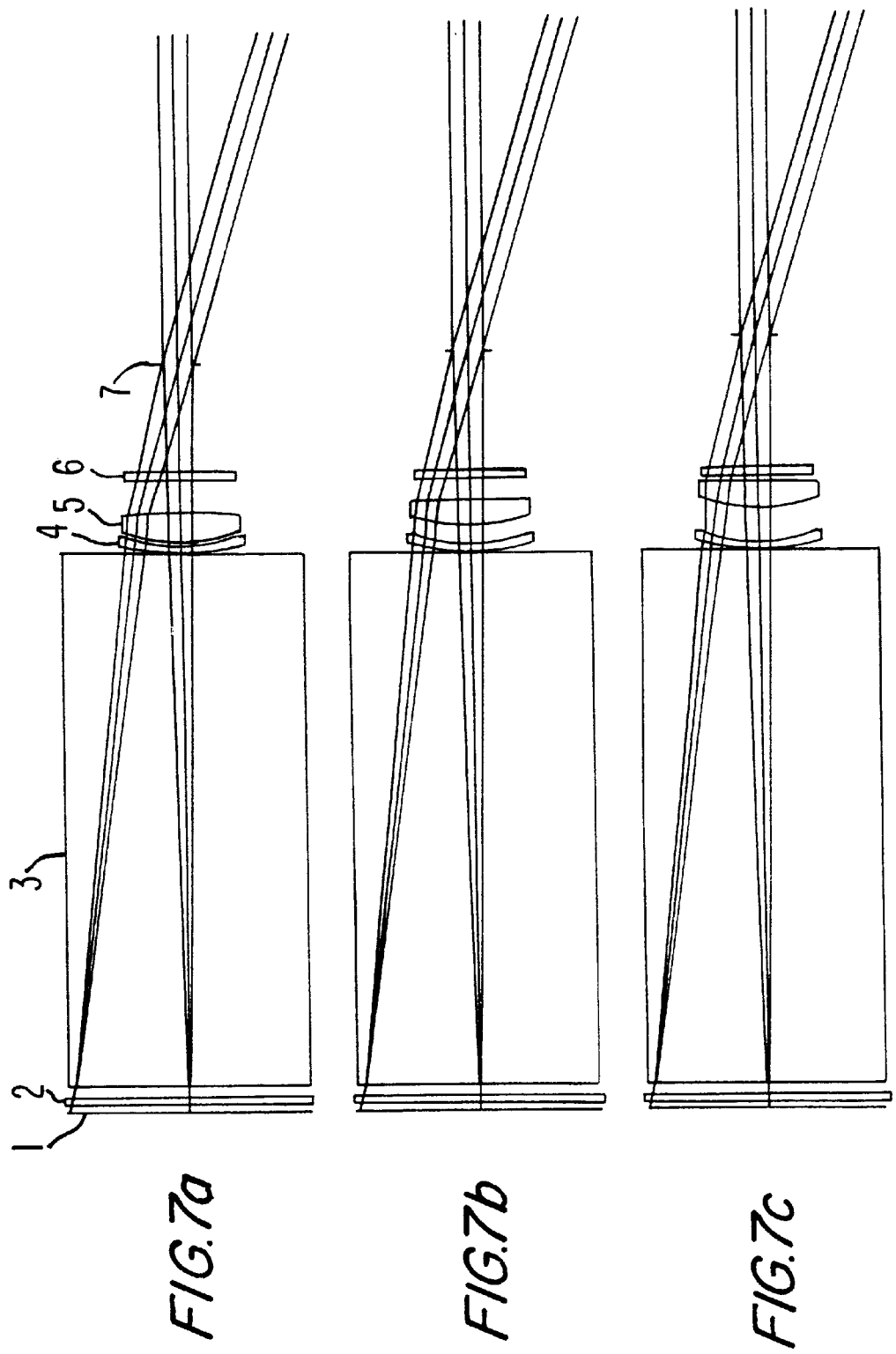

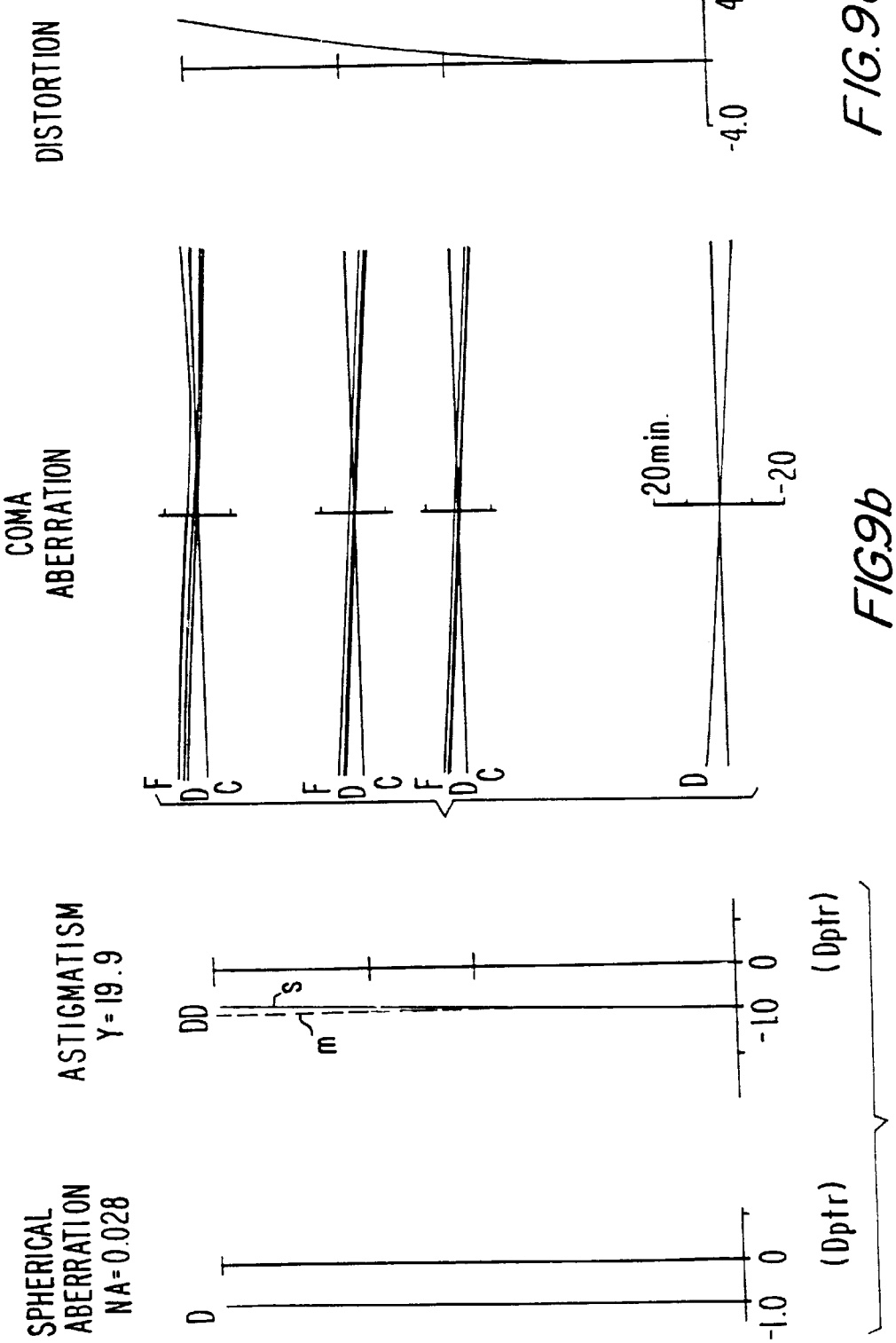

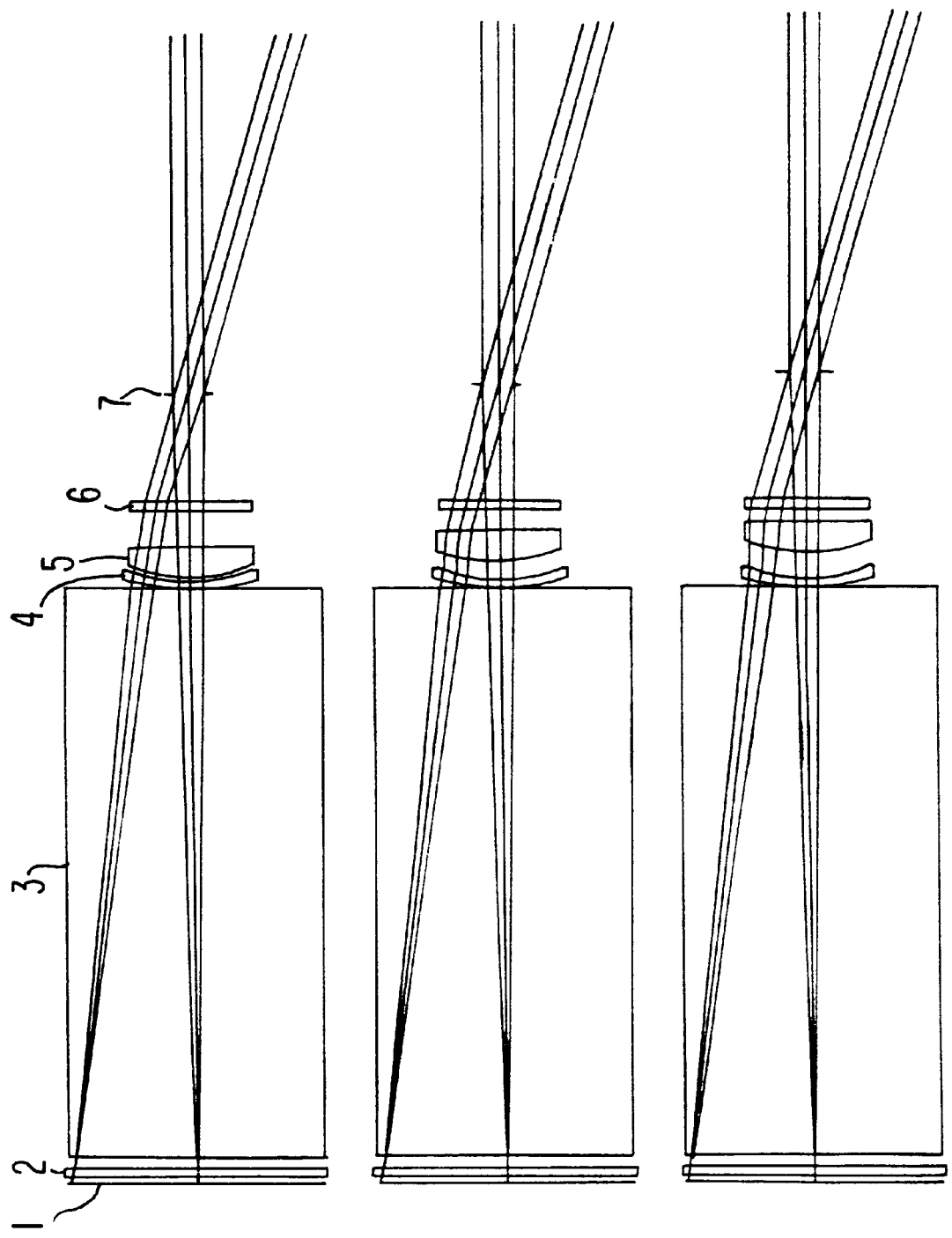

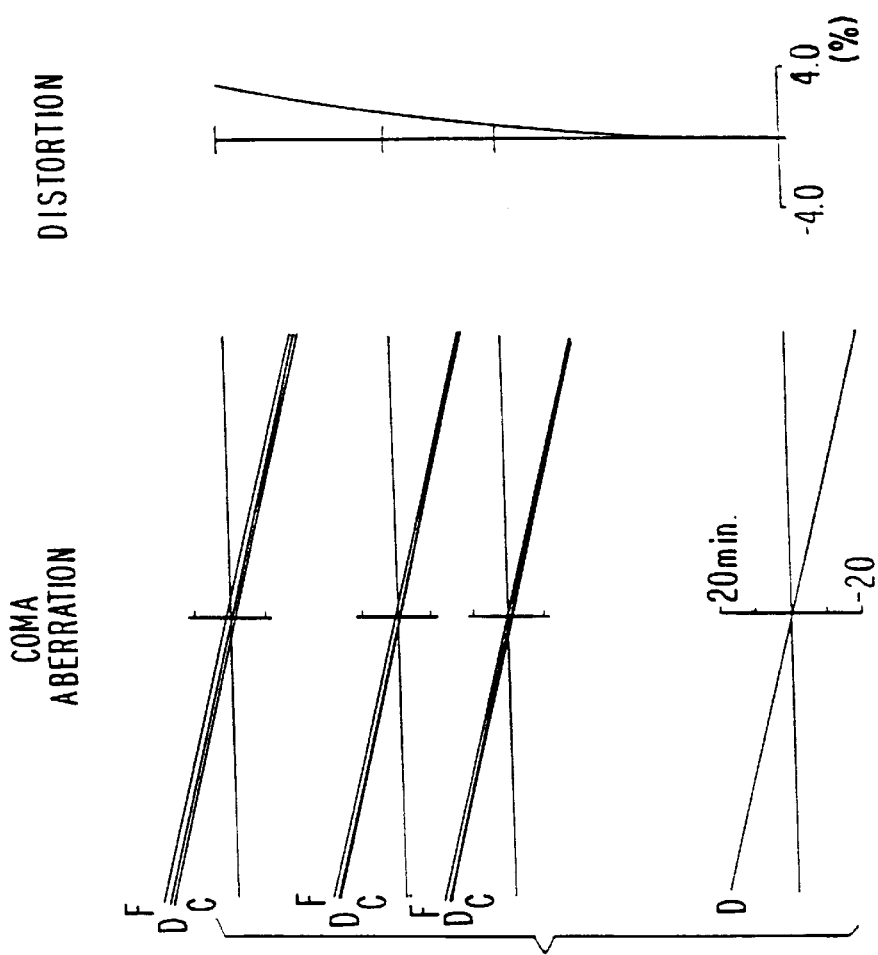
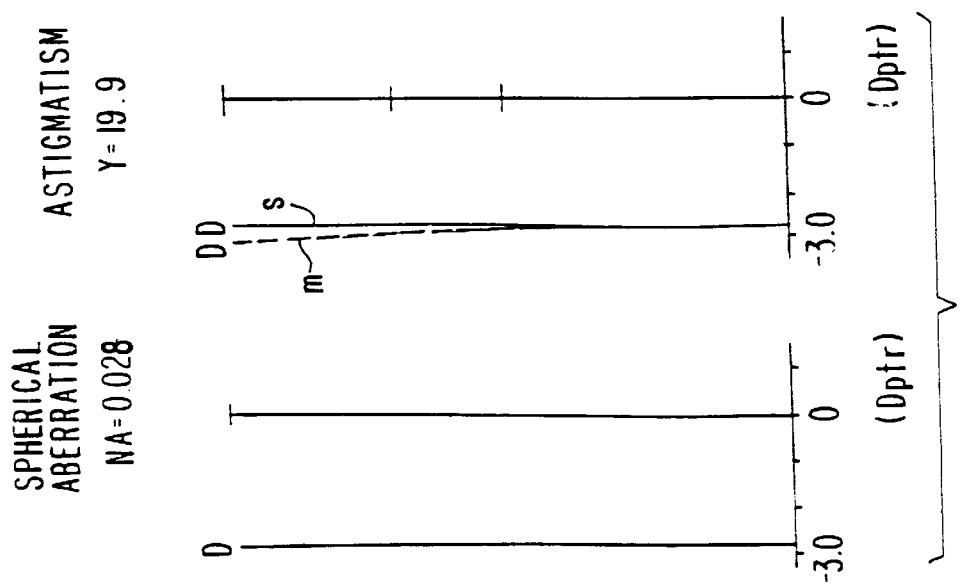
FIG.20c
FIG.20b
FIG.20a

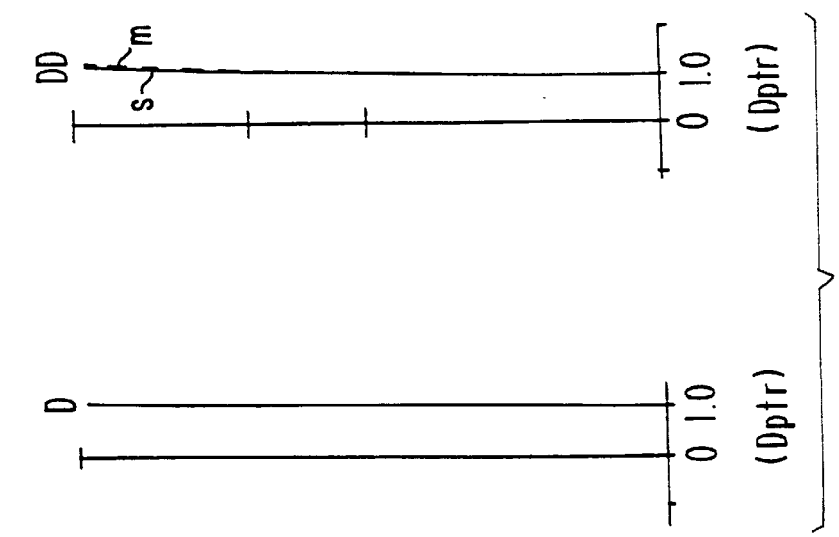
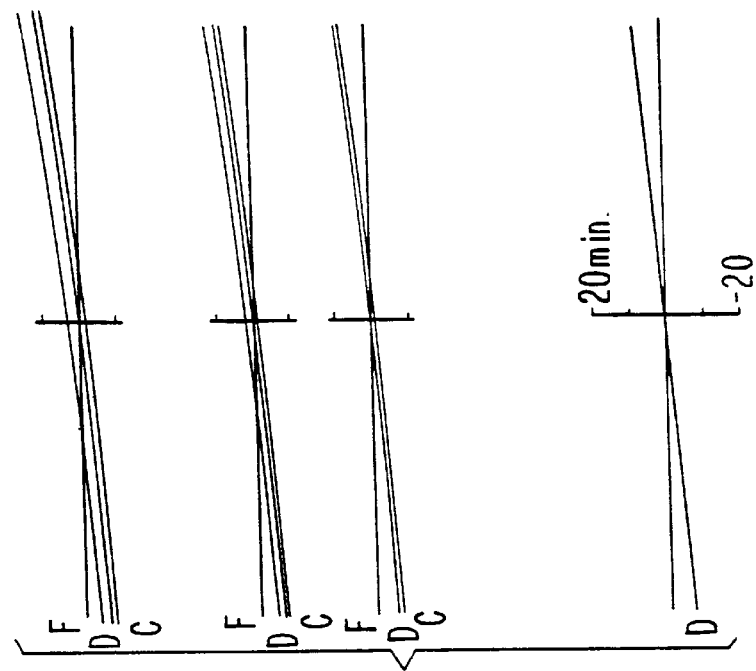
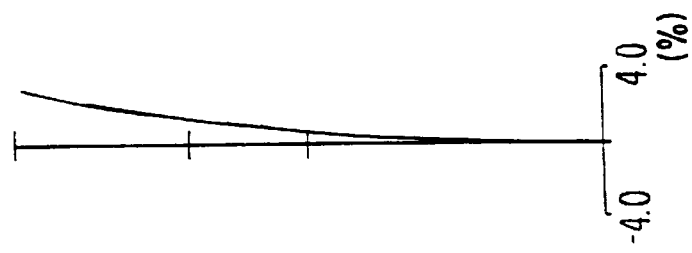
FIG.22a
FIG.22b
FIG.22c

OCULAR OPTICAL SYSTEM FOR A VIEWFINDER WITH VARIABLE VISIBILITY

FIELD OF THE INVENTION

The present invention relates to an ocular optical system for a viewfinder with variable visibility and more particularly to an ocular optical system for a viewfinder which is suitable for a single-lens reflex camera capable of visibility compensation.

BACKGROUND OF THE INVENTION

Conventionally, ocular optical systems for cameras which include two lens groups containing a negative lens and a positive lens arranged in order from the focusing glass side with one of the lenses moved along the optical axis for focusing are known as ocular optical systems for viewfinders used in single-lens reflex cameras.

In a conventional ocular optical system for a viewfinder which is formed of two groups containing two lenses including a negative lens and a positive lens, optical materials with relatively low refractive indexes are used; however, magnification and eye relief (hereafter defined as a distance on the optical axis between the surface closest to the eye point and the eye point) are the main focus when one considers that the refractive power of each lens tends to be increased. As a result, such an optical system is required to have a structure such that the distance between the focusing glass and the ocular optical system along the optical axis, that is the optical distance occupied by an erecting optical system formed of a pentaprism or pentamirror, is shortened.

Shortening of the optical distance of the erecting optical system is effective for minimizing the size of a camera. However, when the optical distance of the erecting optical system is set extremely short, a sufficient field of view is not obtained. Additionally, if the optical distance is set too short it tends to result in an unexpected crossing between optical members for display within the field of view of the viewfinder and the observation light beam. On the other hand, when the optical distance of the erecting optical system is set too long with the objective of obtaining a sufficient field of view and to avoid the unexpected crossing between the optical members for display and the observation light beam, the range of visibility compensation (eyesight correction factor, in diopters) of the ocular optical system for a viewfinder is extremely deviated to the positive side such that it is difficult to maintain sufficient range of visibility including negative visibility on the near vision side.

In a conventional ocular optical system, large coma aberrations are caused in the vicinity of an image plane due to the strong refractive power of each lens. As a result, an objective lens makes it difficult to observe the periphery of an object image formed on the focusing glass or its vicinity.

SUMMARY OF THE INVENTION

The ocular optical system for a camera viewfinder in accordance with the present invention has a simplified structure using a small number of lenses and maintains a sufficient optical distance and range of visibility compensation with minimal aberrations even at the periphery of an image field. The ocular optical system forms an object image on the focusing glass or its vicinity between a focusing glass and an eye point so that the object image is to be observed with the eye point, wherein the ocular optical system omprises, in order from the focusing glass side:

a negative meniscus lens which faces its convex surface to the focusing glass side; and a movable positive lens movable along an optical axis so that it moves without moving the negative meniscus lens with the ocular optical system operating under the following conditions:

$$-0.65 < f2/f1 < -0.5; \quad (1)$$

and $$0.79 < (R2e + R2s)/(R2e - R2s) \leq 1; \quad (2)$$

where:
f1 = focal distance of the negative meniscus lens;
f2 = focal distance of the positive lens;
R 2s = radius of curvature of the surface of the positive lens on the focusing glass side; and
R 2e = radius of curvature of the surface of the positive lens on the eye point side.

According to a more preferred embodiment of the present invention, the ocular tical system satisfies the following conditions:

$$-2.9 < (R1e + R1s)/(R1e - R1s) < -1.7;$$

and $$0.65 < |f1|/fe < 0.9;$$

where:
R 1s = radius of curvature of th e surface of the negative meniscus lens on the focusing glass side;
R 1e = radius of curvature of the surface of the negative meniscus lens on the eye point side;
f1 = focal distance of the negative meniscus lens; and
fe = focal distance of the entire ocular optical system when the positive lens is positioned such that visibility is −1 diopter.

BRIEF DESCRIPTION OF THE DRAWINGS

FIG. 2 is a plan view of the ocular optical system of FIG. 1;

FIG. 5 shows various aberrations at the eye point with visibility of −1.00 diopter for Embodiment 1;

FIG. 7 is a view of the optical path of an ocular optical system corresponding to Embodiment 2 of the present invention;

FIG. 9 shows various aberrations at the eye point with visibility of −1.00 diopter in Embodiment 2;

FIG. 19 is a of the optical path of an ocular optical system corresponding to Embodiment 5 of the present invention;

FIG. 20 shows various aberrations at the eye point with visibility of −2.80 diopter in Embodiment 5;

FIG. 22 shows various aberrations at the eye point with visibility of +1.01 diopter in Embodiment 5.

DETAILED DESCRIPTION OF THE PREFERRED EMBODIMENTS OF THE INVENTION

The ocular optical system for a camera viewfinder in accordance with the present invention comprises, in order from the focusing glass side, a negative meniscus lens which faces its convex surface to the focusing glass side and a positive lens with the positive lens being movable along the optical axis without moving the negative lens.

This structure is effective in placing a front principal point of the ocular optical system in relation to the focusing glass side, that is, placing the principal point on the focusing glass side (referred hereafter as the "front principal point") as close to an eye point as possible such that a large distance between the ocular optical system and the eye point, that is, maximum eye relief, is obtained. Also, the positive lens is moved along the optical axis without moving the negative lens such that visibility can be compensated in a sufficient range. Additionally, in the ocular optical system for a viewfinder of the present invention, the erecting optical system has a pentaprism or pentamirror placed between the focusing glass and the negative meniscus lens such that the object image projected on the focusing glass is observed as an erect image.

Figure 1:
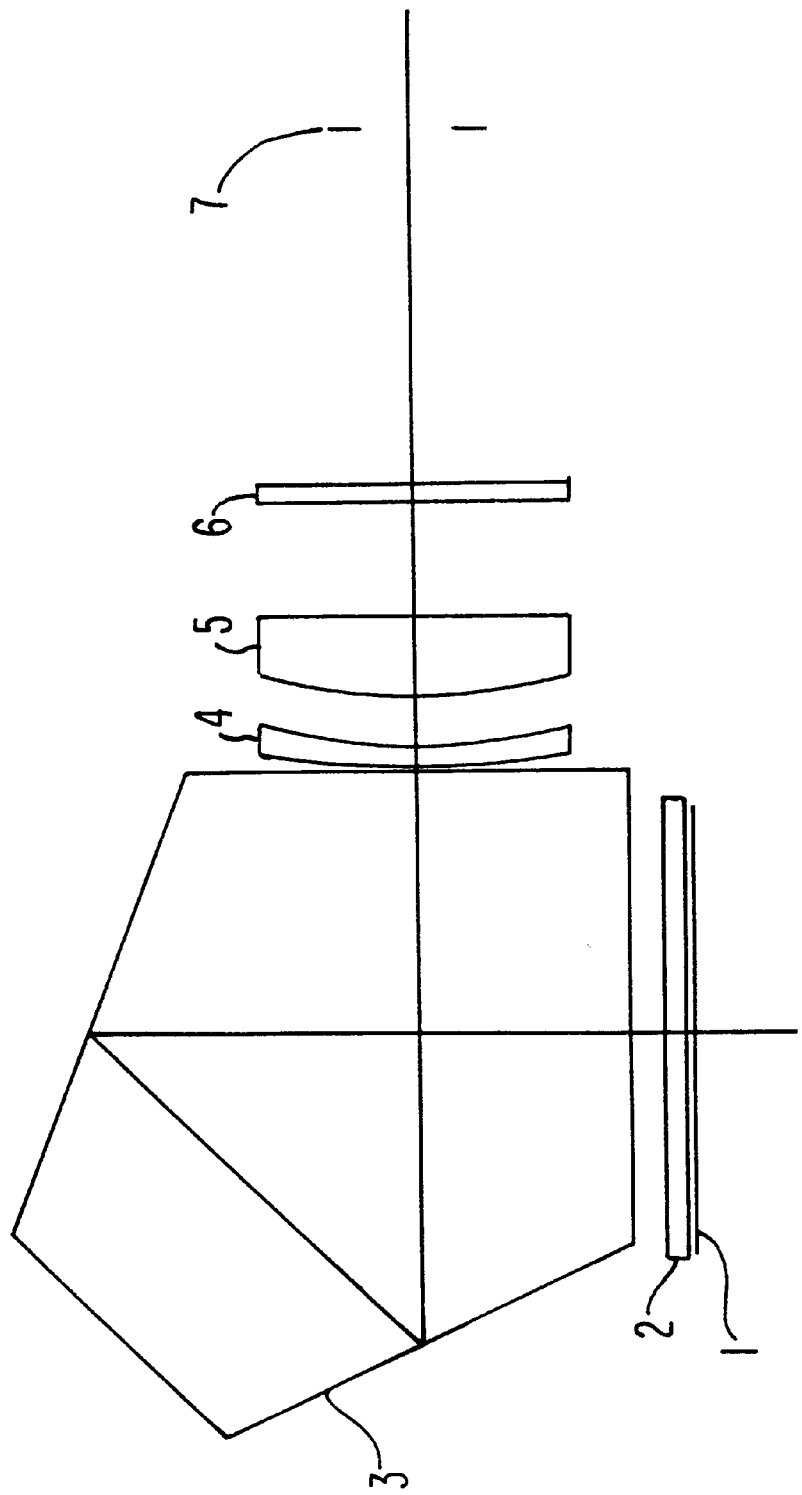
FIG. 1 is a schematic diagram in cross section of the ocular optical system of the present invention.

FIG. 1 is a cross sectional schematic diagram of the ocular optical system for a camera viewfinder in accordance with the present invention. FIG. 2 is a plan view of the ocular optical system of FIG. 1. In all of the embodiments or the present invention, as shown in the figures, the ocular optical system is applied to a viewfinder of a single-lens reflex camera.

In FIG. 1, the object image 1 is formed at the vicinity of focusing glass 2 by an objective lens (image lens), which is not shown in the figures, of a single-lens reflex camera. A light beam from object image 1 enters the ocular optical system after passing through pentaprism 3 which defines the erecting optical member of the ocular optical system.

In all of the embodiments of the present invention, the ocular optical system comprises, in order from the focusing glass side, a negative meniscus lens 4, which has its convex surface facing to the focusing glass side, and a positive lens 5. Visibility compensation is performed by moving positive lens 5 along the optical axis without moving the negative meniscus lens 4. After passing through the ocular optical system (4, 5), the light beam reaches eye point 7 via parallel plane protective glass plate 6. As a result, the magnified object image and field frame, formed on focusing glass 2, can be observed at eye point 7 via the ocular optical system (4, 5).

The viewfinder ocular optical system of the present invention should preferably satisfy the following conditions:

$$-0.65 < f2/f1 < -0.5; \quad (1)$$

and $$0.79 < (R2e + R2s)/(R2e - R2s) \leq 1; \quad (2)$$

where:

f1=the focal distance of the negative meniscus lens;

f2=the focal distance of the positive lens;

R 2s=the radius of curvature of the surface of the positive lens on the focusing glass side; and R 2e=the radius of curvature of the surface of the positive lens on the eye point side.

Condition (1) defines the basic arrangement of the two lens groups inclusive of a negative meniscus lens and a positive lens having two reflective powers, that is, a ratio of reflective powers of the negative meniscus lens and the positive lens.

When the lower limit of condition (1) is exceeded, the front principal point of the ocular optical system comes close to the focusing glass such that the distance between the ocular optical system and the eye point (that is, the eye relief) cannot be maintained large. Also, the refractive power of the negative meniscus lens relative to the whole ocular optical system becomes too large preventing sufficient magnification from being obtained.

On the other hand, when the upper limit of condition (1) is exceeded, the front principal point comes close to the eye point such that the distance between the ocular optical system and the eye point becomes larger. However, the optical distance occupied by an erecting optical member is required to be extremely small. Also, when the range of visibility compensation of a viewfinder optical system is established to be around −1 diopter, the air distance between the negative meniscus lens and the positive lens becomes significantly larger than the amount by which the positive lens moves for visibility compensation. As a result, unnecessary space is generated in the ocular optical system.

Condition (2) defines an appropriate range for a shape factor of the positive lens which moves for visibility compensation within a basic arrangement defined by condition (2).

When the lower limit of condition (2) is exceeded, the principal point of the positive lens moves toward the eye point. As a result, the front principal point of the ocular optical system comes close to the eye point such that the optical distance occupied by the erecting optical system is shortened. Also, an excessive positive coma aberration is generated due to light beams at angle of view which enter the eye point.

On the other hand, when the upper limit of condition (2) is exceeded, the shape of the positive lens becomes a meniscus shape which has its convex surface to the focusing glass side. As a result, it is undesirable that, when a parallel plane member such as a protective glass is placed on the eye point side of the ocular optical system, ghost light due to multiple reflections between the concave surface of the positive lens on the eye point side and the parallel plane member reaches the vicinity of the center of the eye point. Also, an excessive positive coma aberration is generated due to light beams at angle of view which enter the eye point.

Furthermore, in the present invention, the following conditions should be satisfied:

$$-2.9 < (R1e+R1s)/(R1e-R1s) < -1.7; \quad (3)$$

and $$0.65 < |f1|/fe < 0.9; \quad (4)$$

where:
R 1s=the radius of curvature of the surface of said negative meniscus lens on the focusing glass side;
R 1e=the radius of curvature of the surface of said negative meniscus lens on the eye point side;
f1=the focal distance of said negative meniscus lens; and
fe=the focal distance of said entire ocular optical system when said positive lens is positioned such that visibility is −1 diopter.

Condition (3) defines an appropriate range for a shape factor of the negative meniscus lens.

When the lower limit of condition (3) is exceeded, an excessive negative coma aberration is generated due to light beams at various angles of view which enter the eye point; at the same time, an excessive bend of a negative image is caused such that conditions of aberrations are deteriorated.

On the other hand, when the upper limit of condition (3) is exceeded, an excessive positive coma aberration is generated due to light beams at various angles of view which enter the eye point and at the same time, an excessive bend of a positive image is caused such that conditions of aberrations are deteriorated.

Condition (4) defines an appropriate range of refractive power of the negative meniscus lens.

When the lower limit of condition (4) is exceeded, a large fluctuation in aberrations along with visibility compensation is caused, which is not desirable.

On the other hand, when the upper limit of condition (4) is exceeded, the amount by which the positive lens is required to move for visibility compensation becomes excessive, which is not desirable.

Accordingly it is preferable for the following conditions also to be satisfied:

$$1.65 < N1; \quad (5)$$

and $$1.7 < N2; \quad (6)$$

where:
N1=the refractive index of said negative meniscus lens in relation to a "d" line; and
N2=the refractive index of said positive lens in relation to said "d" line.

Conditions (5) and (6) define an appropriate range for refractive indexes of the negative meniscus lens and the positive lens, relatively.

By establishing the refractive indexes of the negative meniscus lens and the positive lens to satisfy conditions (5) and (6), it becomes easier to satisfy conditions (1) through (4).

Embodiment 1

Figures 3A, 3B, 3C:
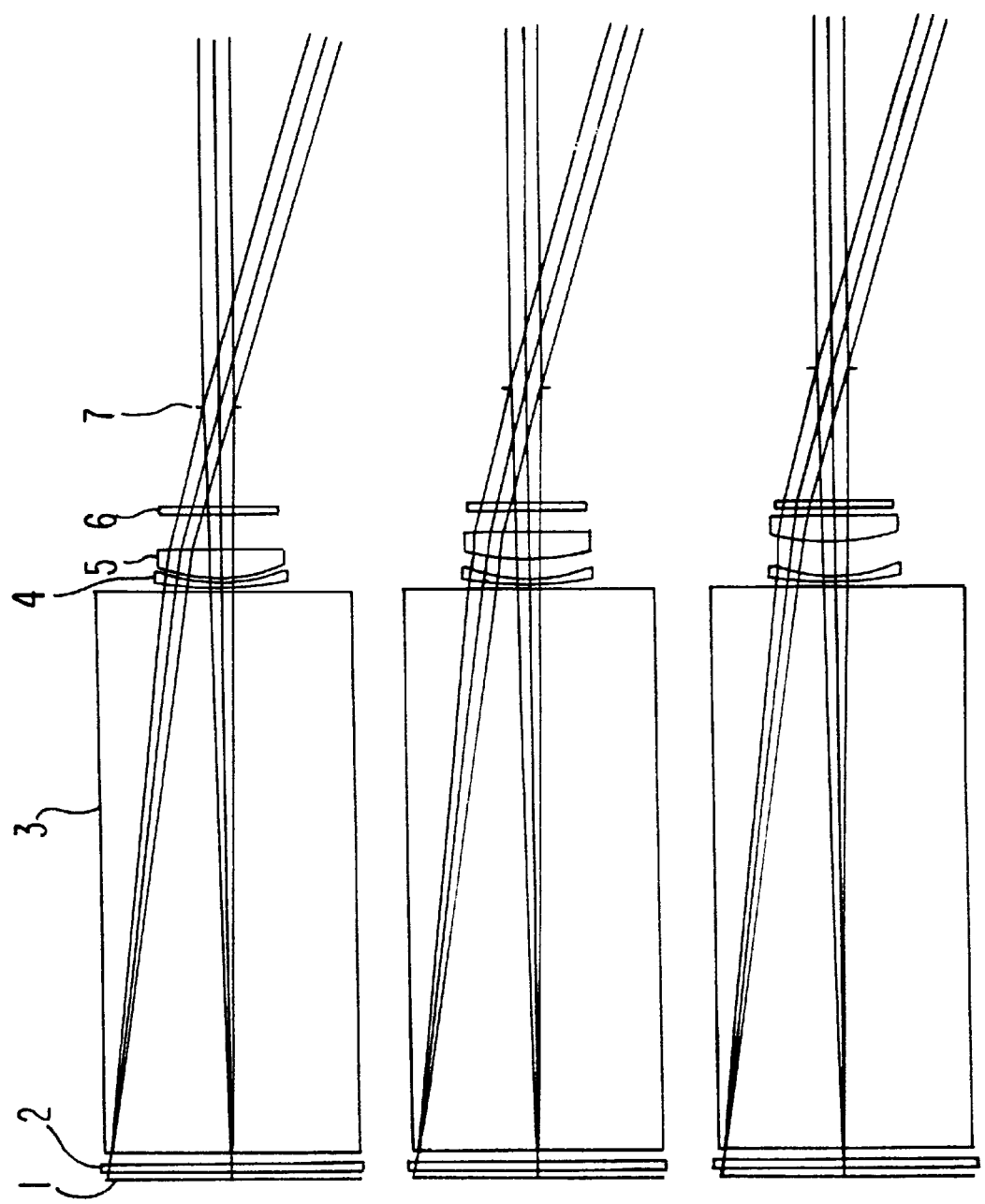
FIG. 3 is a view of the optical path of the ocular optical system corresponding to Embodiment 1 of the present invention.

FIG. 3 is a view of the optical path of the ocular optical system corresponding to Embodiment 1 of the present invention. In FIG. 3, (A) indicates positioning of the lenses Where visibility is −2.81 diopter; (B) shows positioning of the lenses where visibility is −1.00 diopter; and (C) shows positioning of the lenses where visibility is +1.00 diopter. The ocular optical system of Embodiment 1 is formed by the combination of negative meniscus lens 4, which has its convex surface facing the focusing glass side, and biconvex positive lens 5.

The following Table (1) shows various values related to the Embodiment 1 of the present invention. In Table (1), numbers on the left indicate the order of each lens, r is a radius of curvature of each lens surface, d is the distance between each of the lenses, n is the refractive index in relation to the d line ($fÉ$=587.6 nm), and $fË$ is the Abbe number.

TABLE 1

| Range of visibility compensation = −2.81 to +1.00 diopter | | | | |
|---|---|---|---|---|
| | r | d | n | $fË$ |
| 0 | | 0.600 | | (Object image 1) |
| 1 | ∞ | 1.200 | 1.49108 | 57.57 (Focusing Glass 2) |
| 2 | ∞ | 1.900 | | |
| 3 | ∞ | 90.775 | 1.51680 | 64.10 (Prism 3) |
| 4 | ∞ | 0.500 | | |
| 5 | +79.780 | 1.000 | 1.80518 | 25.35 (Negative Lens 4) |
| 6 | +31.98 | (D1 = Variable) | | |
| 7 | +33.010 | 4.500 | 1.80411 | 46.54 (Positive Lens 5) |
| 8 | −310.000 | (D2 = Variable) | | |
| 9 | ∞ | 1.000 | 1.52216 | 58.80 (Parallel plane Plate 6) |
| 10 | ∞ | (D3 = Variable) | | |

| (Variable Distance in Visibility Compensation) | | | |
|---|---|---|---|
| Visibility | D1 | D2 | D3 |
| −2.81 | 0.800 | 6.000 | 16.250 |
| −1.00 | 3.210 | 3.590 | 18.500 |
| +1.00 | 6.000 | 0.800 | 21.100 |

| (Values Corresponding to Conditions) | |
|---|---|
| (1) | f2/f1 = −0.5577 |
| (2) | (R2e + R2s)/(R2e − R2s) = 0.8075 |
| (3) | (R1e + R1s)/(R1e − R1s) = −2.3381 |
| (4) | |f1|/fe = 0.8755 |
| (5) | N1 = 1.80518 |
| (6) | N2 = 1.80411 |

Figures 4A, 4B, 4C:
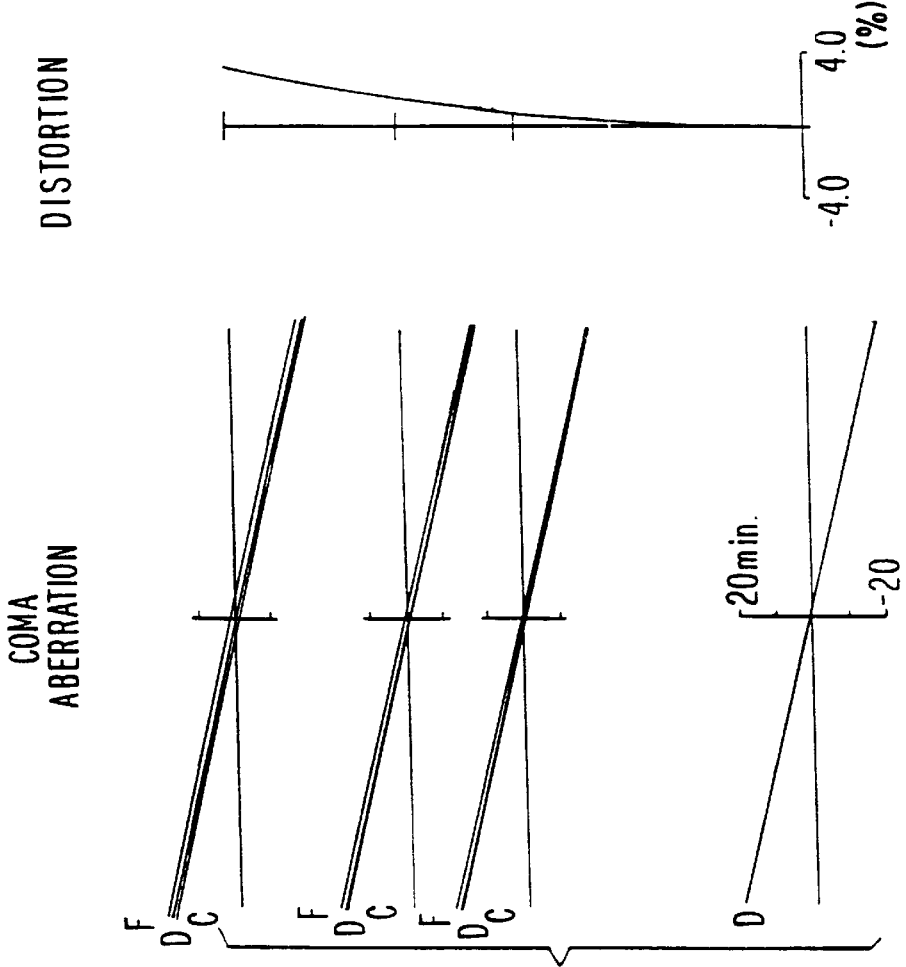
FIG. 4 shows various aberrations at the eye point with visibility of −2.81 diopter for Embodiment 1.
Figure 6C:
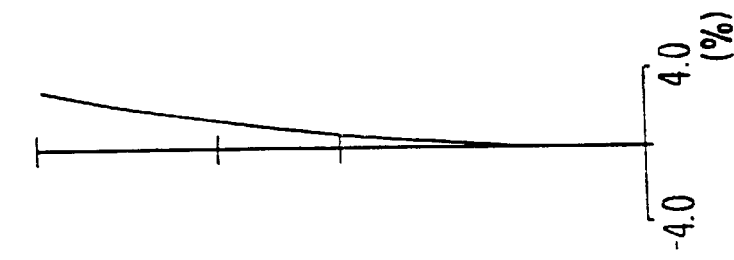
FIG. 6 shows various aberrations at the eye point with visibility of +1.00 diopter in Embodiment 1.
Figure 6B:
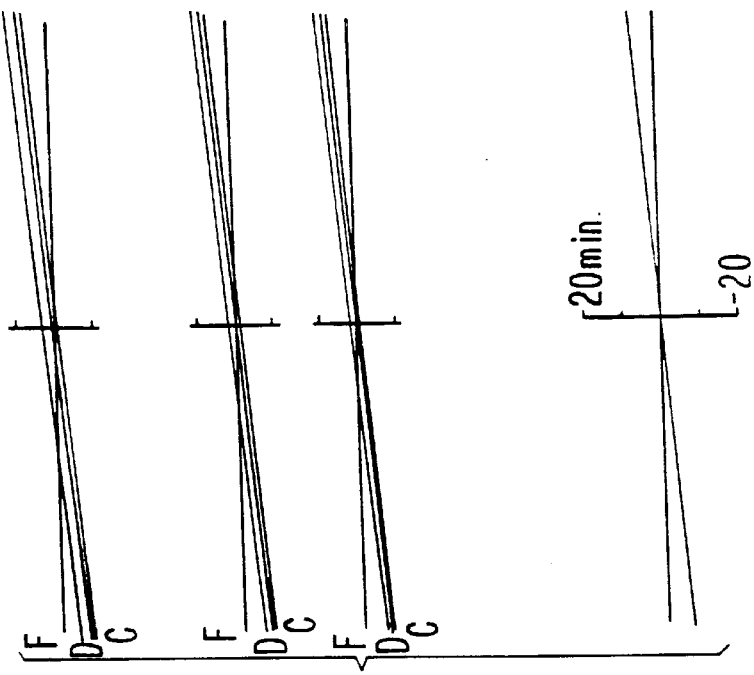
Figure 6A:
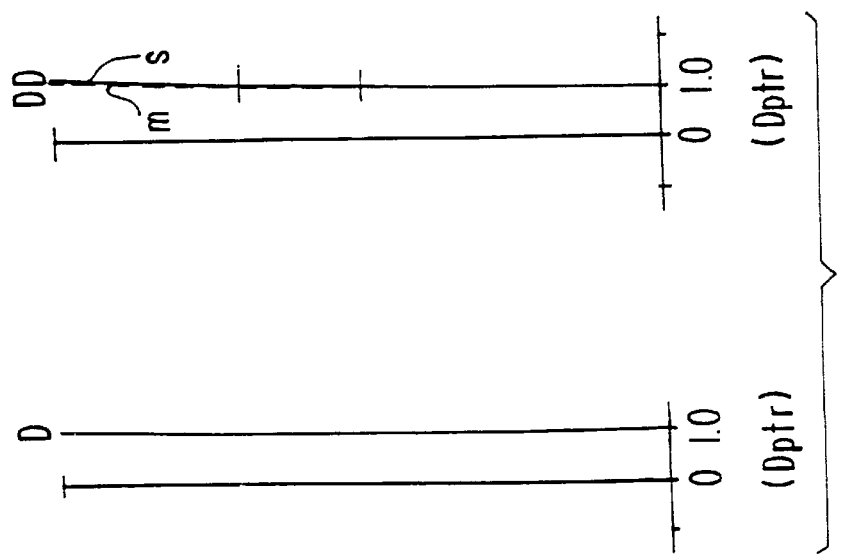

FIGS. 4 through 6 show various aberrations for Embodiment 1. In other words, to FIG. 4 shows various aberrations at the eye point with visibility of −2.81 diopter. FIG. 5 shows various aberrations at the eye point with visibility of −1.00 diopter. FIG. 6 shows various aberrations at the eye point with visibility of +1.00 diopter.

In each drawing showing aberrations, NA indicates numerical aperture of the center light beam, Y is an image height of object image 1 through the objective lens, C is the C line ($fÉ$=656.3 nm), D is the d line ($fÉ$=587.6 nm), and F is the F line ($fÉ$=486.1 nm).

Additionally, in the drawing showing astigmatism, solid line s indicates the sagittal image plane, and dotted line m is the meridional image plane. Also, in the drawings showing spherical aberrations and astigmatism, Dptr indicates diopter. Furthermore, the drawing showing coma aberrations has minute/second as a unit while the drawing showing distortion has percentage as a unit.

As is obvious from the drawings showing aberrations, In Embodiment 1, various aberrations are excellently compensated for over the entire range of visibility compensation between −2.81 and +1.00 diopter for the peripheries of the image plane.

Embodiment 2

FIG. 7 is a view of the optical path of the ocular optical system corresponding to Embodiment 2 of the present invention. In FIG. 7, (A) indicates positioning of the lenses where visibility is −2.81 diopter; (B) shows the positioning of lenses where visibility is −1.00 diopter; and (C) shows the positioning of lenses where visibility is +0.95 diopter. The ocular optical system of Embodiment 2 is formed by the combination of negative meniscus lens 4, which has its convex surface facing the focusing glass side, and plano-convex lens 5 which has its convex surface facing the focusing glass side.

The following Table (2) shows various values related to Embodiment 2 of the present invention. In Table (2), numbers on the left indicate the order of each lens, r is the radius of curvature of each lens surface, d is the distance between each of the lenses, n is the refractive index in relation to the d line ($f\acute{E}$=587.6 nm), and $f\ddot{E}$ is the Abbe number.

TABLE 2

Range of Visibility Compensation = −2.81~+0.95 Diopter

| | r | d | n | $f\ddot{E}$ | |
|---|---|---|---|---|---|
| 0 | | 0.600 | | | (Object image 1) |
| 1 | ∞ | 1.200 | 1.49108 | 57.57 | (Focusing Glass 2) |
| 2 | ∞ | 1.900 | | | |
| 3 | ∞ | 90.775 | 1.51680 | 64.10 | (Prism 3) |
| 4 | ∞ | 0.500 | | | |
| 5 | +66.083 | 1.000 | 1.80518 | 25.35 | (Negative Lens 4) |
| 6 | +28.017 | (D1 = Variable) | | | |
| 7 | +28.311 | 4.500 | 1.80411 | 46.54 | (Positive Lens 5) |
| 8 | ∞ | (D2 = Variable) | | | |
| 9 | ∞ | 1.000 | 1.52216 | 58.80 | (Parallel plane Plate 6) |
| 10 | ∞ | (D3 = Variable) | | | |

Variable Distance in Visibility Compensation

| Visibility | D1 | D2 | D3 |
|---|---|---|---|
| −2.81 | 0.800 | 5.900 | 18.360 |
| −1.00 | 2.980 | 3.720 | 20.500 |
| +0.95 | 5.400 | 1.300 | 22.860 |

Values Corresponding to Conditions:

| | |
|---|---|
| (1) | f2/f1 = −0.5760 |
| (2) | (R2e + R2s)/(R2e − R2s) = 1.0000 |
| (3) | (R1e + R1s)/(R1e − R1s) = −2.4720 |
| (4) | \|f1\|/fe = 0.8090 |
| (5) | N1 = 1.80518 |
| (6) | N2 = 1.80411 |

Figure 8C:
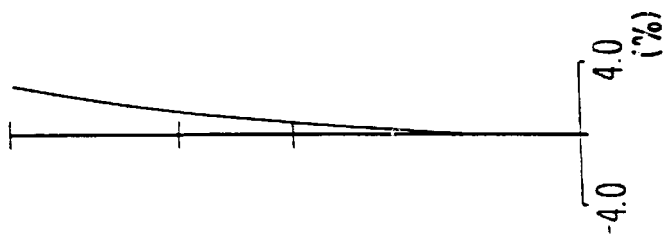
FIG. 8 shows various aberrations at the eye point with visibility of −2.81 diopter in Embodiment 2.
Figure 8B:
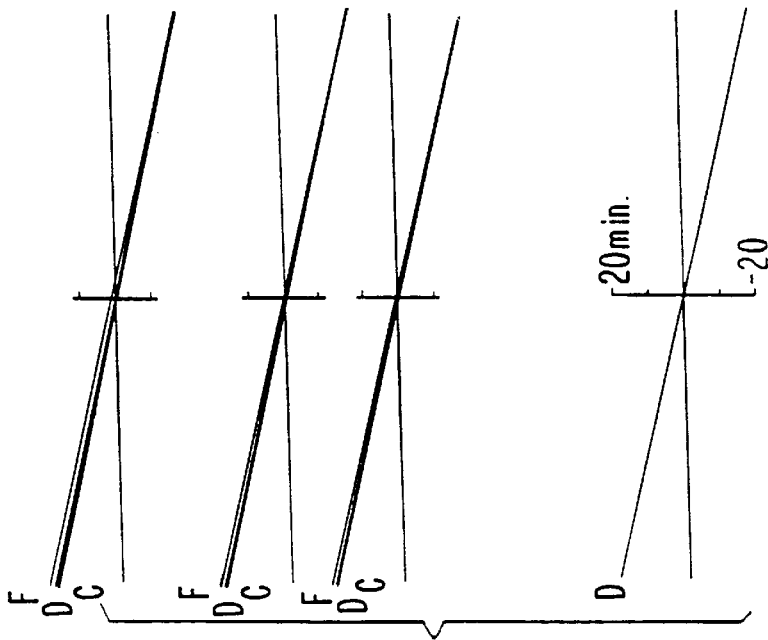
Figure 8A:
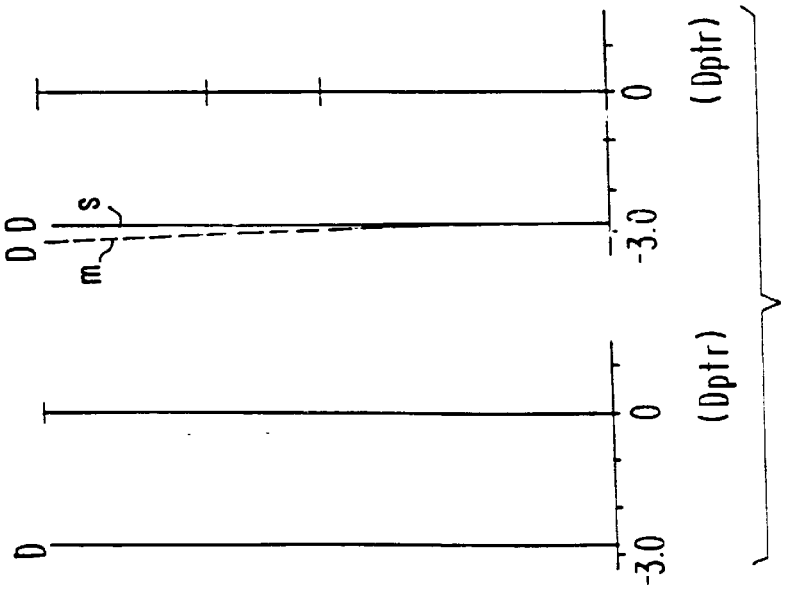
Figure 10C:
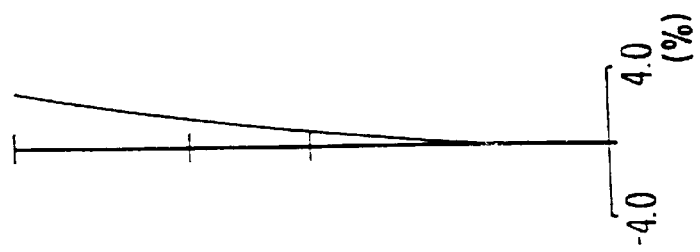
FIG. 10 shows various aberrations at the eye point with visibility of +0.95 diopter in Embodiment 2.
Figure 10B:
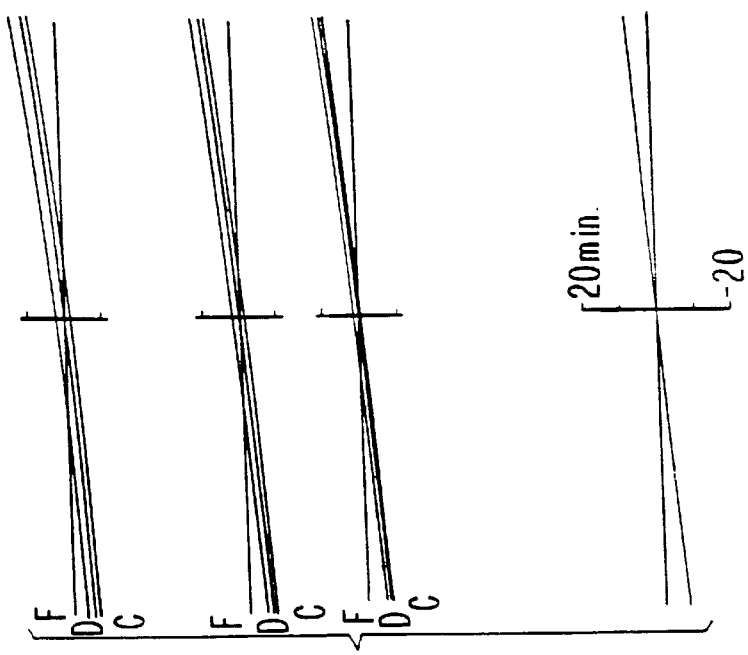
Figure 10A:
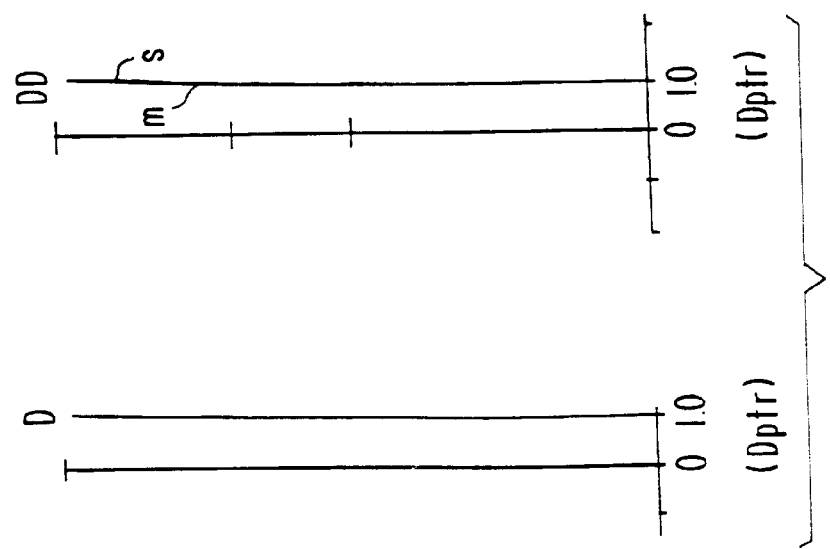

FIGS. 8 through 10 show various aberrations for Embodiment 2. In other words, FIG. 8 shows various aberrations at the eye point with visibility of −2.81 diopter. FIG. 9 shows various aberrations at the eye point with visibility of −1.00 diopter. FIG. 10 shows various aberrations at the eye point with visibility of +0.95 diopter.

In each drawing showing aberrations, NA indicates numerical aperture of the center light beam, Y is an image height of object image 1 through the objective lens, C is the C line ($f\acute{E}$=656.3 nm), D is the d line ($f\acute{E}$=587.6 nm), and F is the F line ($f\acute{E}$=486.1 nm).

Additionally, in the drawing showing astigmatism, solid line s indicates the sagittal image plane, and dotted line m is the meridional image plane. Also, in the drawings showing spherical aberrations and astigmatism, Dptr indicates diopter. Furthermore, the drawing showing coma aberrations has minute/second as a unit while the drawing showing distortion has percentage as a unit.

As obvious from the drawings showing aberrations, In Embodiment 2, various aberrations are excellently compensated for over the entire range of visibility compensation between −2.81 and +0.95 for the peripheries of the image plane.

Embodiment 3

Figures 11A, 11B, 11C:
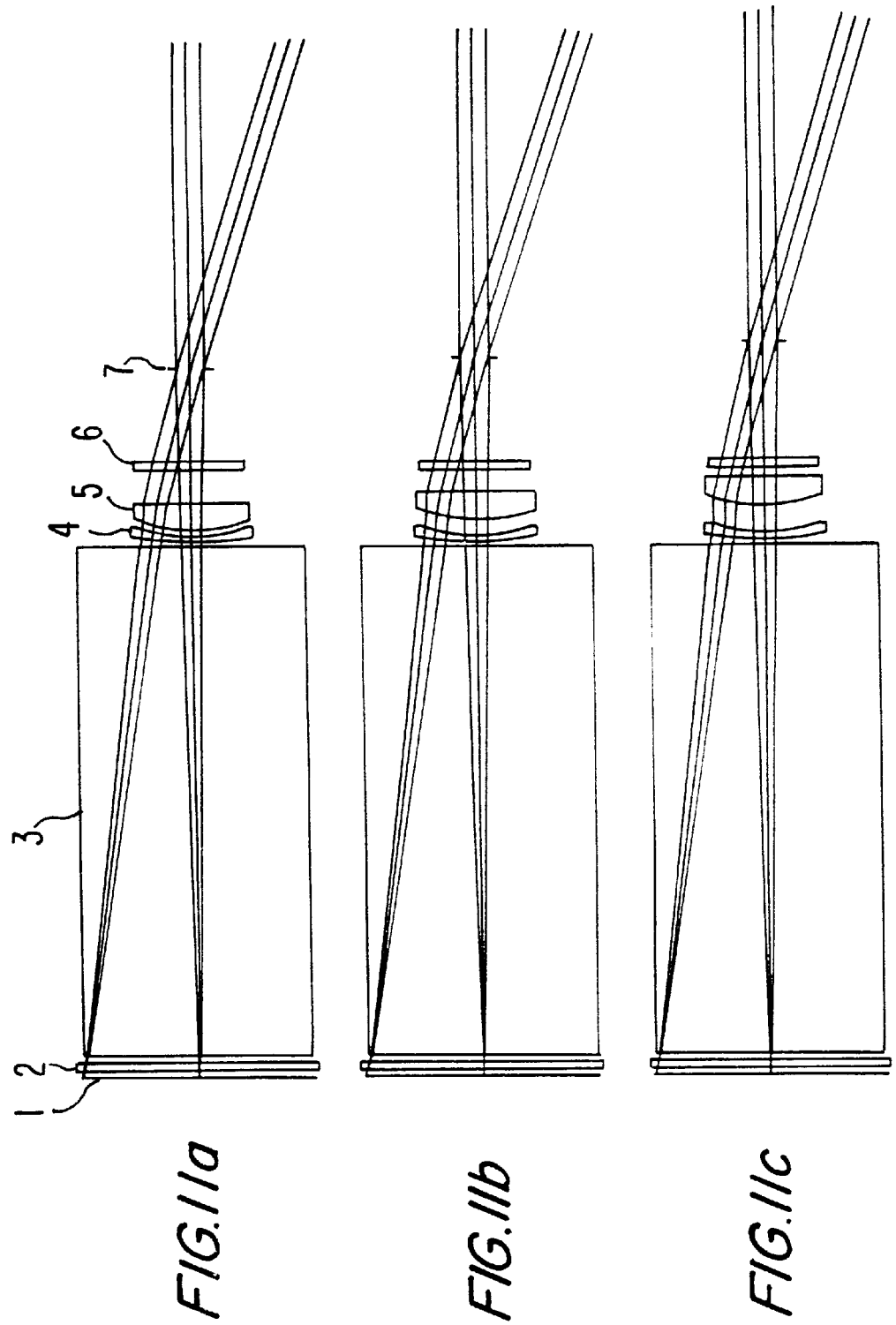
FIG. 11 is a view of the optical path of an ocular optical system corresponding to Embodiment 3 of the present invention.

FIG. 11 is a view of the optical path of an ocular optical system corresponding to Embodiment 3 of the present invention. In FIG. 11, (A) indicates positioning of lenses where visibility is −2.81 diopter; (B) shows the positioning of lenses where visibility is −1.00 diopter; and (C) shows the positioning of lenses where visibility is +1.00 diopter. The ocular optical system of Embodiment 3 is formed by the combination of negative meniscus lens 4, which has its convex surface facing the focusing glass side, and biconvex lens 5.

The following Table (3) shows various values related to Embodiment 3 of the present invention. In Table (3), numbers on the left indicate the order of each lens, r is the radius of curvature of each lens surface, d is the distance between each of the lenses, n is the refractive indexes in relation to the d line ($f\acute{E}$=587.6 nm), and $f\ddot{E}$ is the Abbe number.

TABLE 3

Range of Visibility Compensation = −2.81~+1.00 Diopter

| | r | d | n | $f\ddot{E}$ | |
|---|---|---|---|---|---|
| 0 | | 0.600 | | | (Object image 1) |
| 1 | ∞ | 1.200 | 1.49108 | 57.57 | (Focusing Glass 2) |
| 2 | ∞ | 1.900 | | | |
| 3 | ∞ | 88.335 | 1.51680 | 64.10 | (Prism 3) |
| 4 | ∞ | 0.500 | | | |
| 5 | +59.850 | 1.000 | 1.84666 | 23.82 | (Negative Lens 4) |
| 6 | +28.200 | (D1 = Variable) | | | |
| 7 | +28.658 | 4.500 | 1.74810 | 52.30 | (Positive Lens 5) |
| 8 | −371.000 | (D2 = Variable) | | | |
| 9 | ∞ | 1.000 | 1.52216 | 58.80 | (Parallel plane Plate 6) |
| 10 | ∞ | (D3 = Variable) | | | |

Variable Distance in Visibility Compensation:

| Visibility | D1 | D2 | D3 |
|---|---|---|---|
| −2.81 | 0.800 | 5.900 | 16.860 |
| −1.00 | 3.030 | 3.670 | 19.000 |
| +1.00 | 5.600 | 1.100 | 21.460 |

Values Corresponding to Conditions:

| | |
|---|---|
| (1) | f2/f1 = −0.5591 |
| (2) | (R2e + R2s)/(R2e − R2s) = 0.8566 |
| (3) | (R1e + R1s)/(R1e − R1s) = −2.7820 |
| (4) | \|f1\|/fe = 0.8648 |
| (5) | N1 = 1.84666 |
| (6) | N2 = 1.74810 |

Figure 12C:
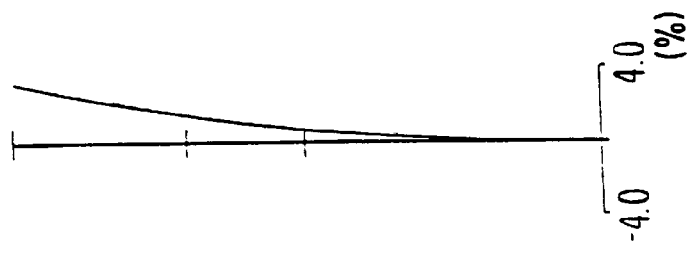
FIG. 12 shows various aberrations at the eye point with visibility of −2.81 diopter in Embodiment 3.
Figure 12B:
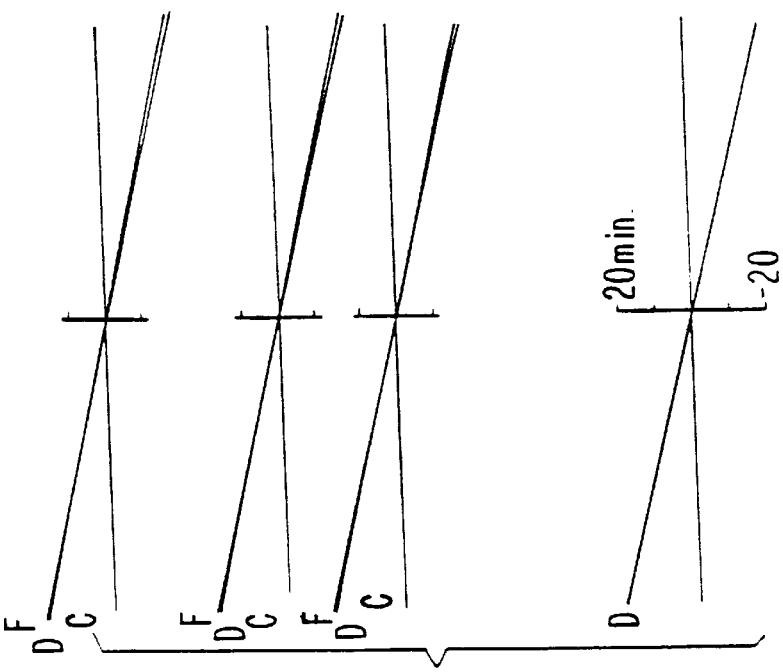
Figure 12A:
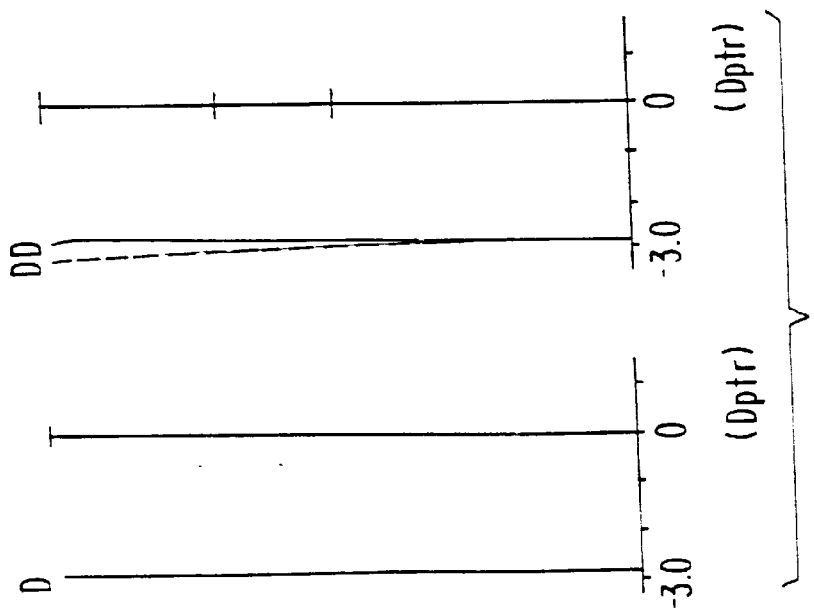
Figure 13C:
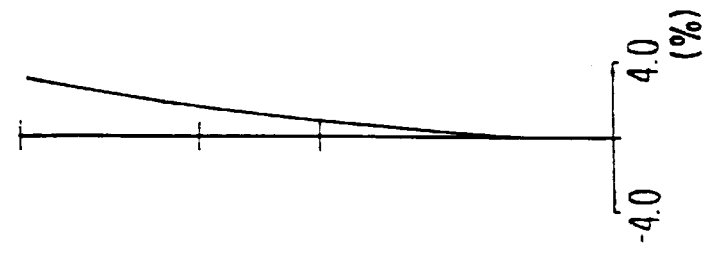
FIG. 13 shows various aberrations at the eye point with visibility of −1.00 diopter in Embodiment 3.
Figure 13B:
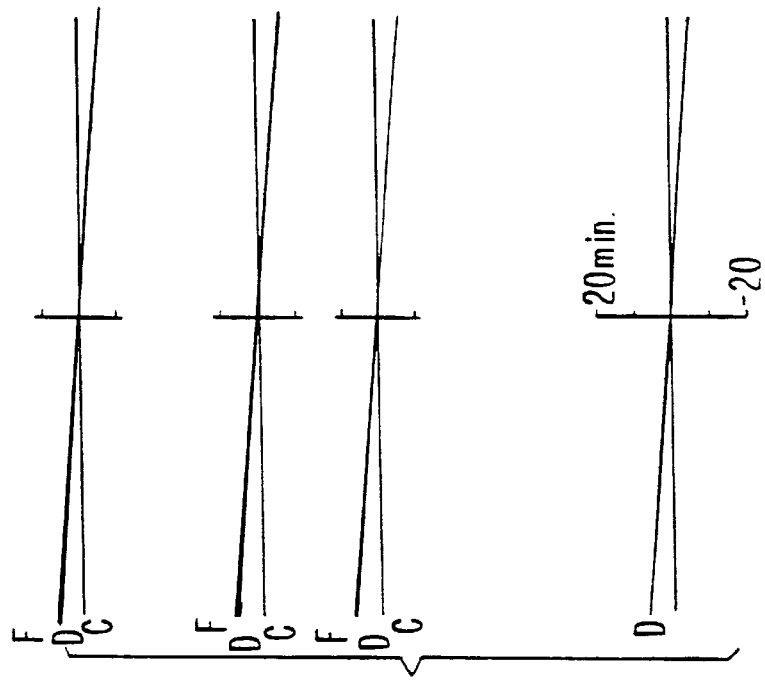
Figure 13A:
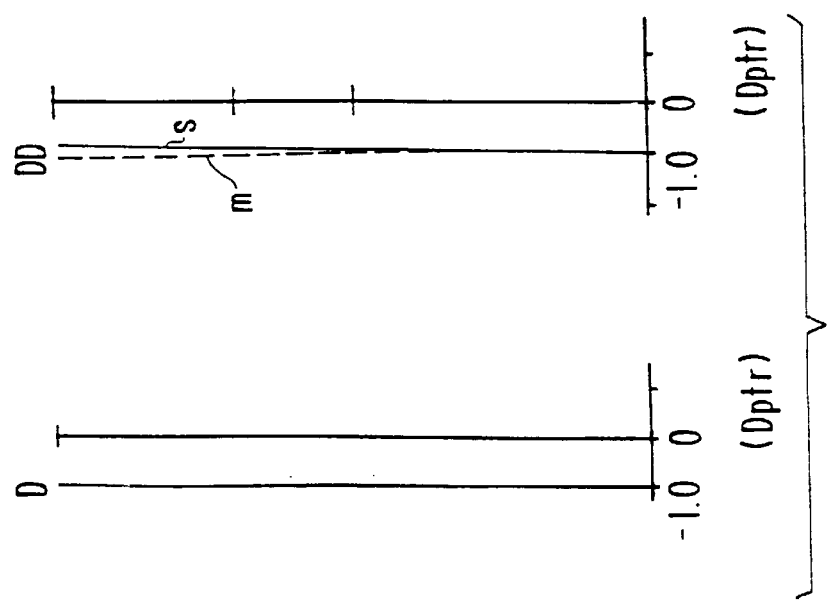
Figure 14C:
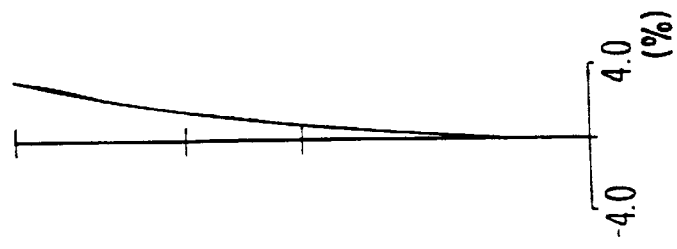
FIG. 14 shows various aberrations at the eye point with visibility of +1.00 diopter in Embodiment 3.
Figure 14B:
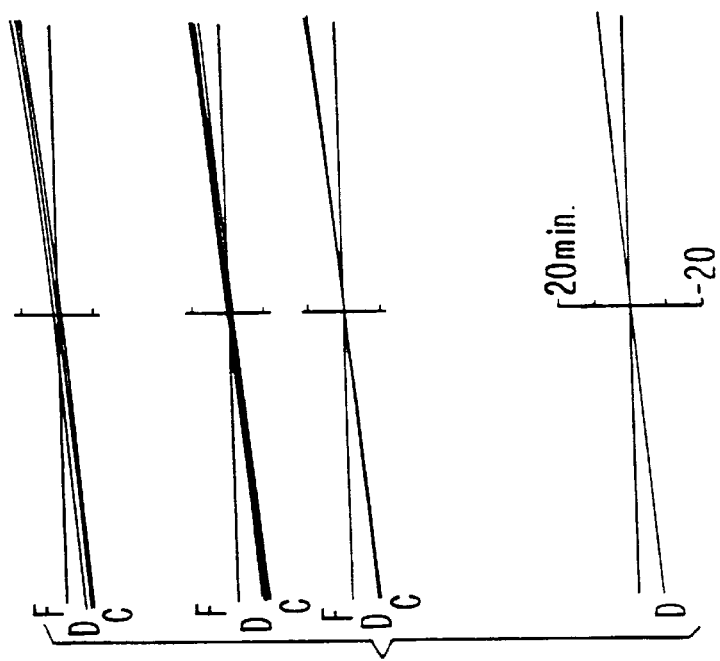
Figure 14A:
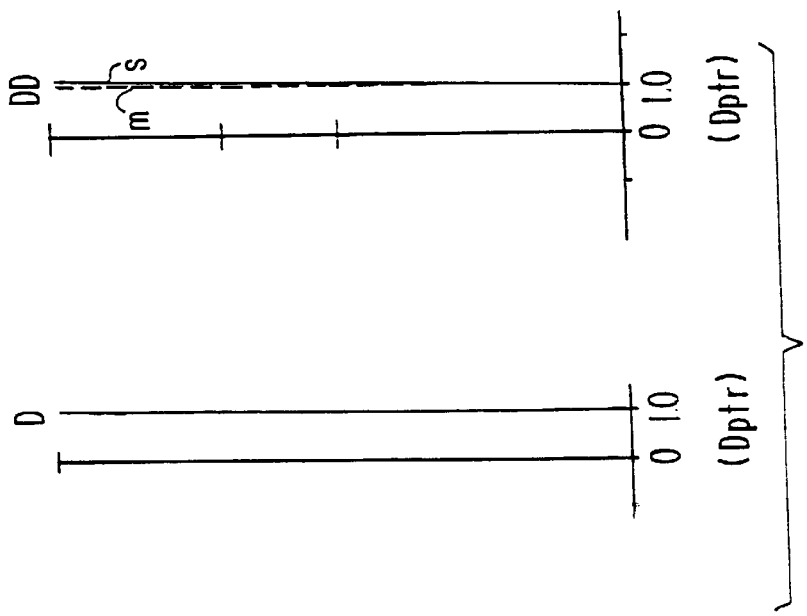

FIGS. 12 through 14 show various aberrations for Embodiment 3. In other words, FIG. 12 shows various aberrations at the eye point with visibility of −2.81 diopter. FIG. 13 shows various aberrations at the eye point with visibility of −1.00 diopter. FIG. 14 shows various aberrations at the eye point with visibility of +1.00 diopter.

In each drawing showing aberrations, NA indicates numerical aperture of the center light beam, Y is the image height of object image 1 through the objective lens, C is the C line ($f\acute{E}$=656.3 nm), D is the d line ($f\acute{E}$=587.6 nm), and F is the F line ($f\acute{E}$=486.1 nm).

Additionally, in the drawing showing astigmatism, solid line s indicates the sagittal image plane, and dotted line m is the meridional image plane. Also, in the drawings showing spherical aberrations and astigmatism, Dptr indicates diopter. Furthermore, the drawing showing coma aberrations has minute/second as a unit while the drawing showing distortion has percentage as a unit.

As obvious from the drawings showing aberrations, In Embodiment 3, various aberrations are excellently compensated for over the entire range of visibility compensation between −2.81 and +1.00 diopter for the peripheries of the image plane.

Embodiment 4

Figures 15A, 15B, 15C:
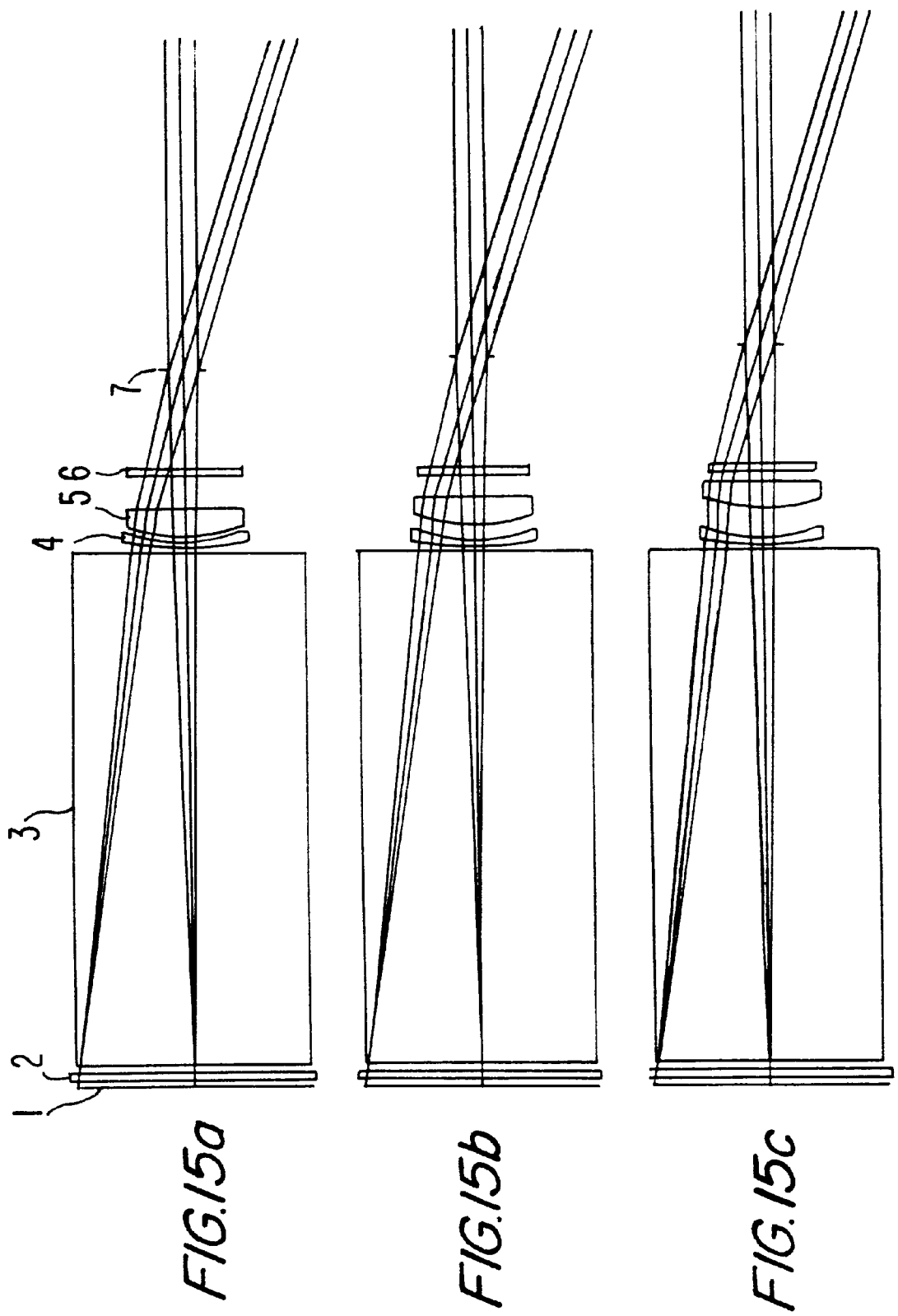
FIG. 15 is a view of the optical path of an ocular optical system corresponding to Embodiment 4 of the present invention.

FIG. 15 is a view of the optical path of an ocular optical system corresponding to Embodiment 4 of the present invention. In FIG. 15, (A) indicates the positioning of lenses where visibility is −2.81 diopter; (B) shows the positioning of the lenses where visibility is −1.00 diopter; and (C) shows the positioning of lenses where visibility is +0.99 diopter. The ocular optical system of Embodiment 4 is formed by the combination of negative meniscus lens 4, which has its convex surface facing the focusing glass side, and plano-convex lens 5 which has its convex surface facing the focusing glass side.

The following Table (4) shows various values related to Embodiment 4 of the present invention. In Table (4), numbers on the left indicate the order of each lens, r is the radius of curvature of each lens surface, d is the distance between each of the lenses, n is the refractive indexes in relation to the d line ($fÉ$=587.6 nm), and $fË$ is the Abbe number.

TABLE 4

Range of Visibility Compensation = −2.81~+0.99 Diopter

| | r | d | n | $fË$ |
|---|---|---|---|---|
| 0 | | 0.600 | | (Object image 1) |
| 1 | ∞ | 1.200 | 1.49108 | 57.57 (Focusing Glass 2) |
| 2 | ∞ | 1.900 | | |
| 3 | ∞ | 88.335 | 1.51680 | 64.10 (Prism 3) |
| 4 | ∞ | 0.500 | | |
| 5 | +60.569 | 1.000 | 1.80518 | 25.35 (Negative Lens 4) |
| 6 | +23.795 | (D1 = Variable) | | |
| 7 | +24.372 | 4.500 | 1.78797 | 47.47 (Positive Lens 5) |
| 8 | ∞ | (D2 = Variable) | | |
| 9 | ∞ | 1.000 | 1.52216 | 58.80 (Parallel plane Plate 6) |
| 10 | ∞ | (D3 = Variable) | | |

Variable Distance in Visibility Compensation

| Visibility | D1 | D2 | D3 |
|---|---|---|---|
| −2.81 | 1.000 | 5.700 | 17.300 |
| −1.00 | 2.700 | 4.000 | 19.000 |
| +0.99 | 4.600 | 2.100 | 20.890 |

Values Corresponding to Conditions:

| (1) | f2/f1 = −0.6277 |
| (2) | (R2e + R2s)/(R2e − R2s) = 1.0000 |
| (3) | (R1e + R1s)/(R1e − R1s) = −2.2941 |
| (4) | |f1|/fe = 0.6686 |
| (5) | N1 = 1.80518 |
| (6) | N2 = 1.78797 |

Figures 16A, 16B, 16C:
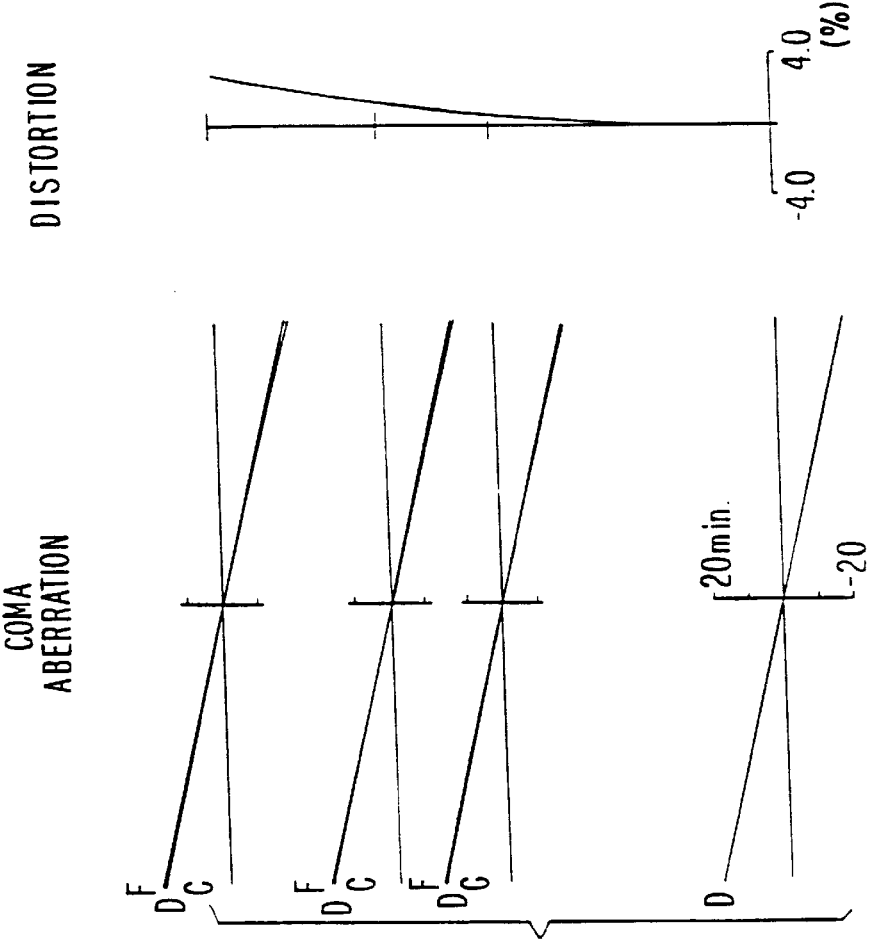
FIG. 16 shows various aberrations at the eye point with visibility of −2.81 diopter in Embodiment 4.
Figure 17C:
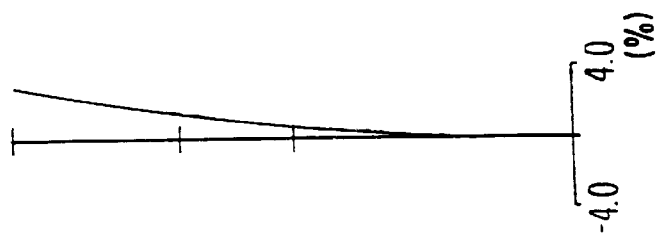
FIG. 17 shows various aberrations at the eye point with visibility of −1.00 diopter in Embodiment 4.
Figure 17B:
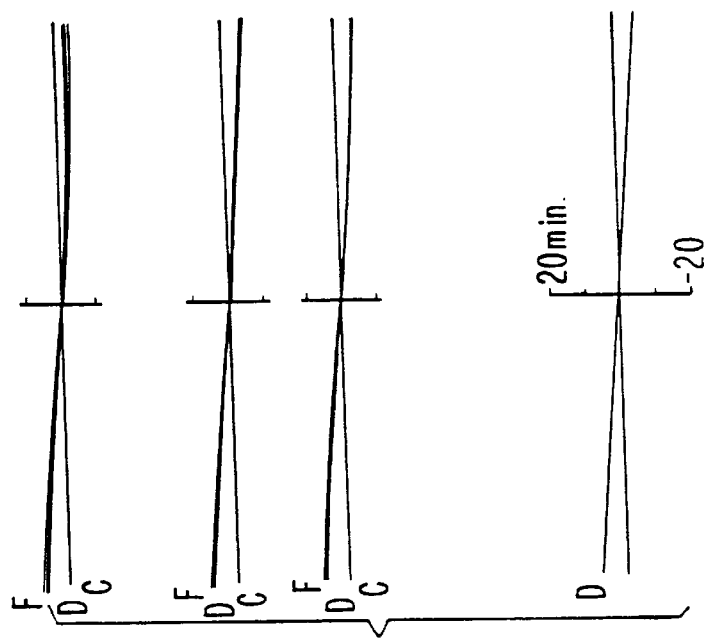
Figure 17A:
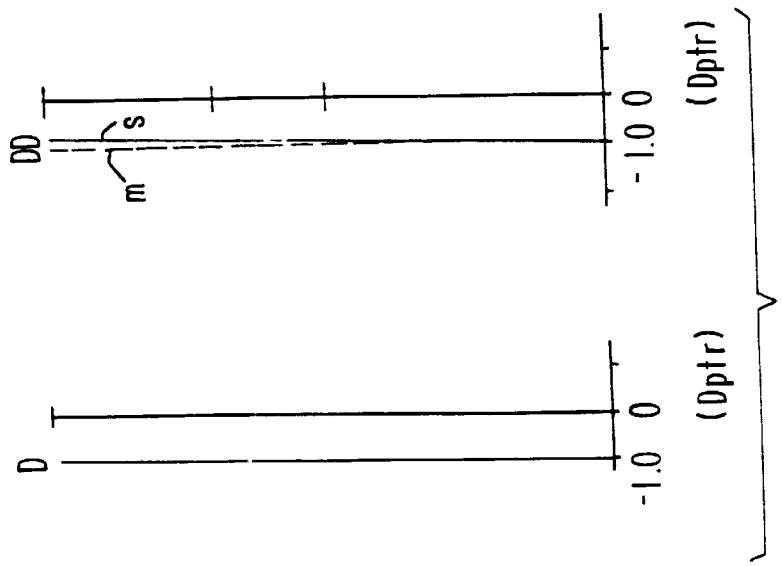
Figure 18C:
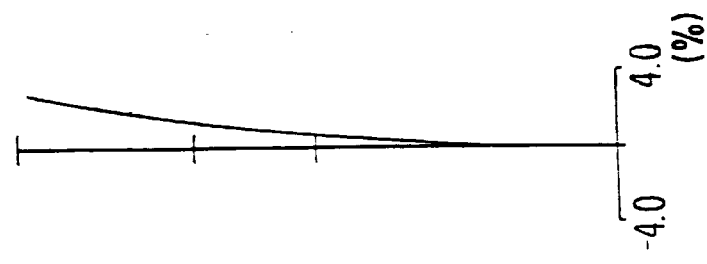
FIG. 18 shows various aberrations at the eye point with visibility of +0.99 diopter in Embodiment 4.
Figure 18B:
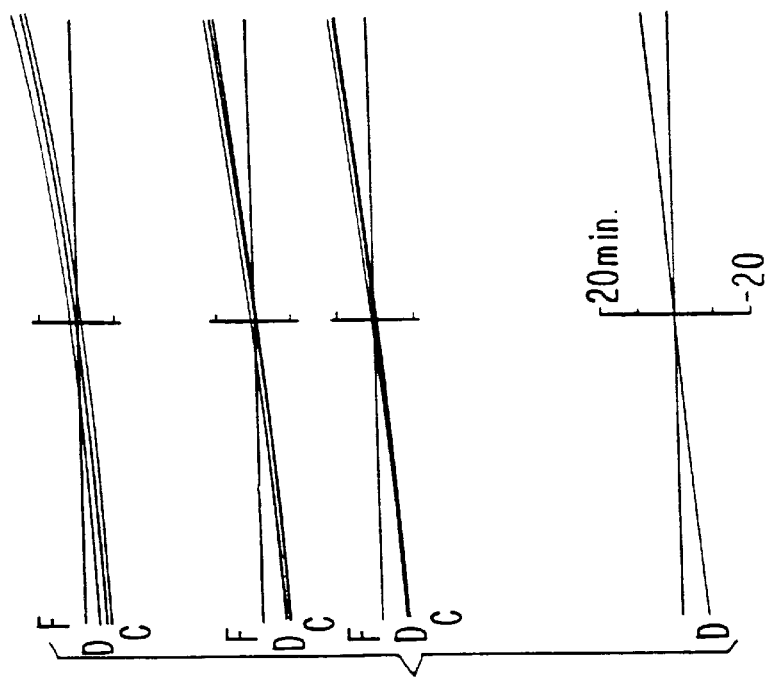
Figure 18A:
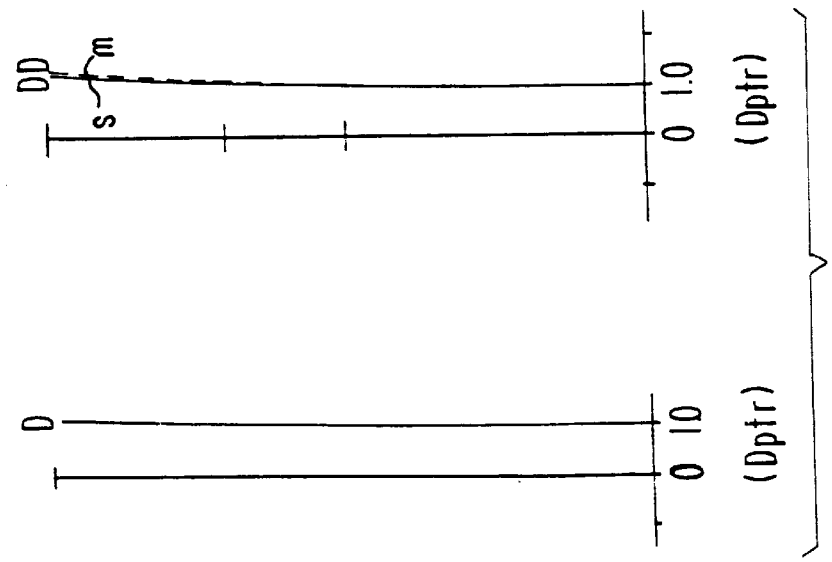

FIGS. 16 through 18 show various aberrations of Embodiment 4. In other words, FIG. 16 shows various aberrations at the eye point with visibility of −2.81 diopter. FIG. 17 shows various aberrations at the eye point with visibility of −1.00 diopter. FIG. 18 shows various aberrations at the eye point with visibility of +0.99 diopter.

In each drawing showing aberrations, NA indicates numerical aperture of the center light beam, Y is the image height of object image 1 through the objective lens, C is the C line ($fÉ$=656.3 nm), D is the d line ($fÉ$=587.6 nm), and F is the F line ($fÉ$=486.1 nm).

Additionally, in the drawing showing astigmatism, solid line s indicates the sagittal image plane, and dotted line m is the meridional image plane. Also, in the drawings showing spherical aberrations and astigmatism, Dptr indicates diopter. Furthermore, the drawing showing coma aberrations has minute/second as a unit while the drawing showing distortion has percentage as a unit.

As obvious from the drawings showing aberrations, In Embodiment 4, various aberrations are excellently compensated for over the entire range of visibility compensation between −2.81 and +0.99 diopter for the peripheries of the image plane.

Embodiment 5

FIG. 19 is a of the optical path of an ocular optical system corresponding to Embodiment 5 of the present invention. In FIG. 19, (A) indicates the positioning of lenses where visibility is −2.80 diopter; (B) shows the positioning of lenses where visibility is −1.00 diopter; and (C) shows the positioning of lenses where visibility is +1.01 diopter. The ocular optical system of Embodiment 4 is formed of negative meniscus lens 4, which has its convex surface facing the focusing glass side, and biconvex lens 5.

The following Table (5) shows various values related to Embodiment 5 of the present invention. In Table (5), numbers on the left indicate the order of each lens, r is the radius of curvature of each lens surface, d is the distance between each of the lenses, n is the refractive index in relation to the d line ($fÉ$=587.6 nm), and $fË$ is the Abbe number.

TABLE 5

Range of Visibility Compensation = −2.80~+1.01 Diopter

| | r | d | n | $fË$ |
|---|---|---|---|---|
| 0 | | 0.600 | | (Object image 1) |
| 1 | ∞ | 1.200 | 1.49108 | 57.57 (Focusing Glass 2) |
| 2 | ∞ | 1.900 | | |
| 3 | ∞ | 90.775 | 1.51680 | 64.10 (Prism 3) |
| 4 | ∞ | 0.500 | | |
| 5 | +89.880 | 1.000 | 1.69895 | 30.04 (Negative Lens 4) |
| 6 | +25.460 | (D1 = Variable) | | |
| 7 | +26.910 | 4.500 | 1.77279 | 49.45 (Positive Lens 5) |
| 8 | −300.000 | (D2 = Variable) | | |
| 9 | ∞ | 1.000 | 1.52216 | 58.80 (Parallel plane Plate 6) |
| 10 | ∞ | (D3 = Variable) | | |

Variable Distance in Visibility Compensation

| Visibility | D1 | D2 | D3 |
|---|---|---|---|
| −2.80 | 0.800 | 5.900 | 17.190 |
| −1.00 | 2.620 | 4.080 | 19.000 |
| +1.01 | 4.700 | 2.000 | 21.060 |

Values Corresponding to Conditions:

| (1) | f2/f1 = −0.6285 |
| (2) | (R2e + R2s)/(R2e − R2s) = 0.8354 |
| (3) | (R1e + R1s)/(R1e − R1s) = −1.7904 |
| (4) | |f1|/fe = 0.6718 |
| (5) | N1 = 1.69895 |
| (6) | N2 = 1.77279 |

Figure 21C:
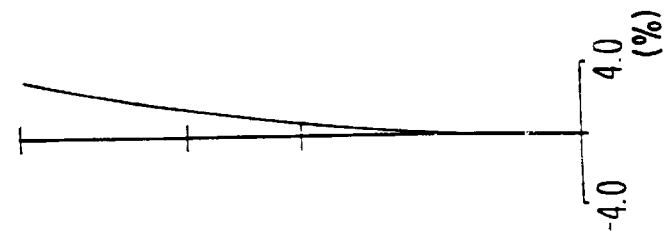
FIG. 21 shows various aberrations at the eye point with visibility of −1.00 diopter in Embodiment 5.
Figure 21B:
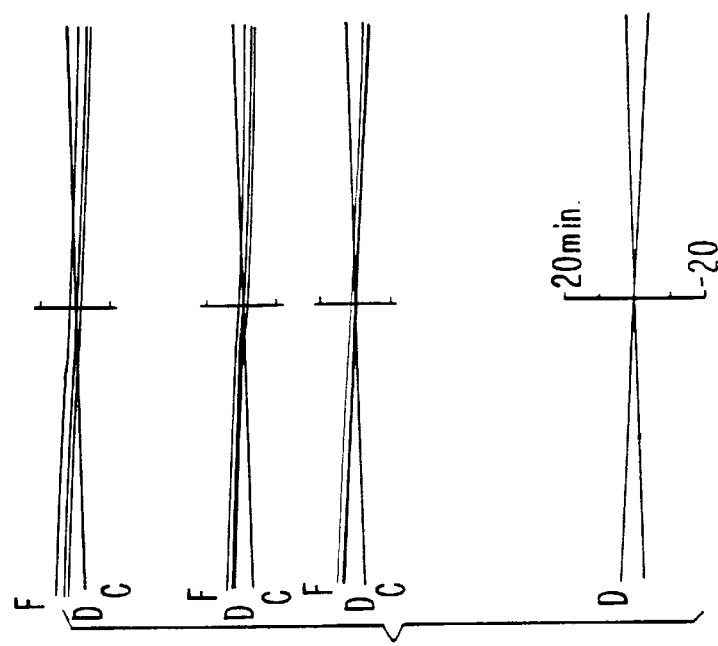
Figure 21A:
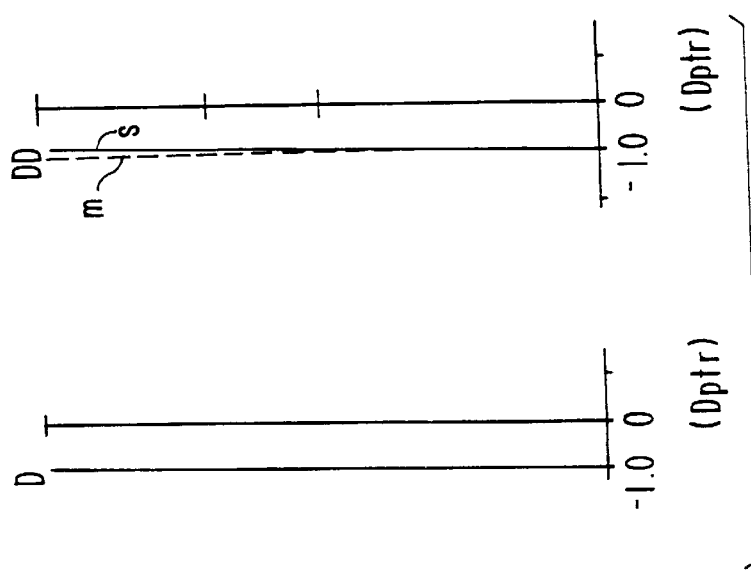

FIGS. 20 through 22 show various aberrations of Embodiment 5. In other words, FIG. 20 shows various aberrations at the eye point with visibility of −2.80 diopter. FIG. 21 shows various aberrations at the eye point with visibility of −1.00 diopter. FIG. 22 shows various aberrations at the eye point with visibility of +1.01 diopter.

In each drawing showing aberrations, NA indicates numerical aperture of the center light beam, Y is the image height of object image 1 through the objective lens, C is the C line ($f\acute{E}$=656.3 nm), D is the d line ($f\acute{E}$=587.6 nm), and F is the F line ($f\acute{E}$=486.1 nm).

Additionally, in the drawing showing astigmatism, solid line s indicates the sagittal image plane, and dotted line m is the meridional image plane. Also, in the drawings showing spherical aberrations and astigmatism, Dptr indicates diopter. Furthermore, the drawing showing coma aberrations has minute/second as a unit while the drawing showing distortion has percentage as a unit.

As obvious from the drawings showing aberrations, In Embodiment 5, various aberrations are excellently compensated for over the entire range of visibility compensation between −2.80 and +1.01 diopter for the peripheries of the image plane.

What we claim is:

1. An ocular optical system for a viewfinder in a camera in which an object image to be observed by an eye point is formed on a focusing glass or its vicinity between the focusing glass and the eye point, comprising; in order from the focusing glass side:

a negative meniscus lens which has a convex surface facing the focusing glass side; and a movable positive lens movable along an optical axis so that it moves without moving the negative meniscus lens with the ocular optical system arranged to satisfy the following conditions:

$$-0.65 < f2/f1 < -0.5; \quad (1)$$

and $$0.79 < (R2e+R2s)/(R2e-R2s) \leq 1; \quad (2)$$

where:
   f1=focal distance of the negative meniscus lens;
   f2=focal distance of the positive lens;
   R 2s=radius of curvature of the surface of the positive lens on the focusing glass side; and
   R 2e=radius of curvature of the surface of the positive lens on the eye point side.

2. An ocular optical system as described in claim 1 arranged to satisfy the following additional conditions:

$$-2.9 < (R1e+R1s)/(R1e-R1s) < -1.7;$$

and $$0.65 < |f1|/fe < 0.9;$$

where:
   R1s=the radius of curvature of the surface of said negative meniscus lens on the focusing glass side;
   R1e=the radius of curvature of the surface of said negative meniscus lens on the eye point side;
   f1=a focal distance of said negative meniscus lens; and
   fe=the focal distance of said entire ocular optical system when said positive lens is positioned such that visibility is −1 diopter.

3. An ocular optical system as described in claim 1 arranged to satisfy the following additional conditions:

$$1.65 < N1;$$

and $$1.7 < N2;$$

where:

N1=refractive index of said negative meniscus lens in relation to the d line; and
   N2=refractive index of said positive lens in relation to said d line.

4. An ocular optical system as described in claim 2 arranged to satisfy the following conditions:

$$1.65 < N1;$$

and $$1.7 < N2$$

where:
   N1=the refractive index of said negative meniscus lens in relation to the "d" line; and
   N2=the refractive index of said positive lens in relation to said "d" line.

5. An ocular optical system for a viewfinder in a camera in which an object image to be observed by an eye point is formed on a focusing glass or its vicinity between the focusing glass and the eye point comprising, in order from the focusing glass side: an erecting optical system; a negative meniscus lens which has a convex surface facing the focusing glass side; and a movable positive lens movable along an optical axis so that it moves without moving the negative meniscus lens to provide visibility correction, with the ocular optical system arranged to satisfy the following conditions:

$$-0.65 < f2/f1 < -0.5; \quad (1)$$

and $$0.79 < (R2e+R2s)/(R2e-R2s) \leq 1; \quad (2)$$

where:
   f1=focal distance of the negative meniscus lens;
   f2=focal distance of the positive lens;
   R2s=radius of curvature of the surface of the positive lens on the focusing glass side; and
   R2e=radius of curvature of the surface of the positive lens on the eye point side.

6. An ocular optical system as in claim 5 in which said erecting optical system is composed of a prism.

7. An ocular optical system as described in claim 6 arranged to satisfy the following conditions:

$$-2.9 < (R1e+R1s)/(R1e-R1s) < -1.7;$$

and $$0.65 < |f1|/fe < 0.9;$$

where:
   R1s=the radius of curvature of the surface of said negative meniscus lens on the focusing glass side;
   R1e=the radius of curvature of the surface of said negative meniscus lens on the eye point side;
   f1=a focal distance of said negative meniscus lens; and
   fe=the focal distance of said entire ocular optical system when said positive lens is positioned such that visibility is −1 diopter.

8. An ocular optical system as described in claim 6 arranged to satisfy the following conditions:

$$1.65 < N1;$$

and $1.7 < N2$ where:

N1=the refractive index of said negative meniscus lens in relation to the "d" line; and N2=the refractive index of said positive lens in relation to said "d" line.

9. An ocular optical system as described in claim 7 arranged to satisfy the following conditions:

$1.65 < N1;$ and $1.7 < N2$ where:

N1=the refractive index of said negative meniscus lens in relation to the "d" line; and N2=the refractive index of said positive lens in relation to said "d" line.

10. An ocular optical system as described in claim 5 in which said erecting optical system is composed of a reflective mirror.

\* \* \* \* \*